Dec. 26, 1967                E. J. FARRELL                3,360,778
              SELF-ADAPTIVE ENCODING AND DECODING SYSTEM
Filed March 18, 1963                              12 Sheets-Sheet 1

INVENTOR
EDWARD J. FARRELL
BY Herbert P. Somemeyer
ATTORNEY

Dec. 26, 1967  E. J. FARRELL  3,360,778
SELF-ADAPTIVE ENCODING AND DECODING SYSTEM
Filed March 18, 1963 12 Sheets-Sheet 2
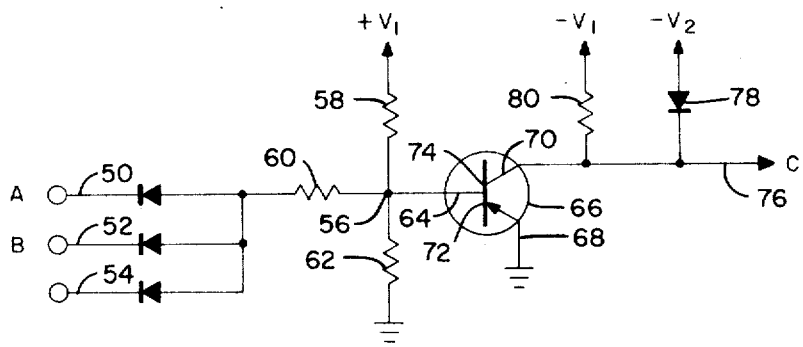
*Fig. 2*
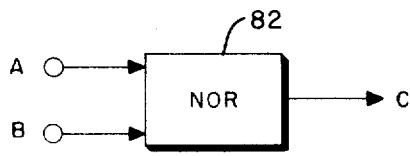
*Fig. 3*
*Fig. 4*
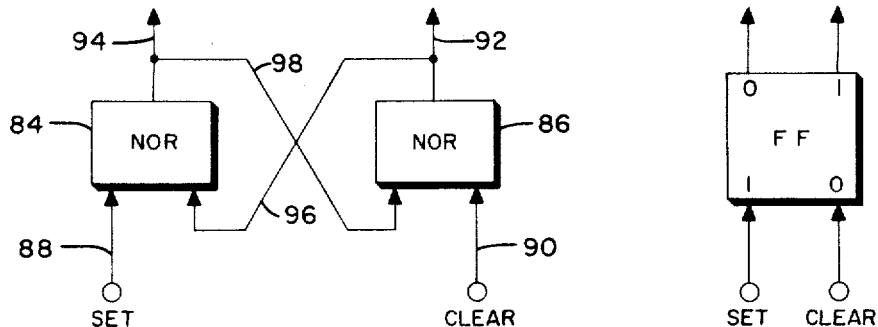
*Fig. 5*
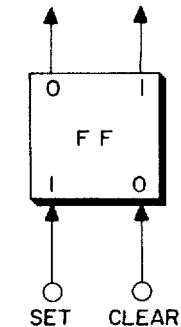
*Fig. 6*

Dec. 26, 1967  E. J. FARRELL  3,360,778
SELF-ADAPTIVE ENCODING AND DECODING SYSTEM
Filed March 18, 1963  12 Sheets-Sheet 7
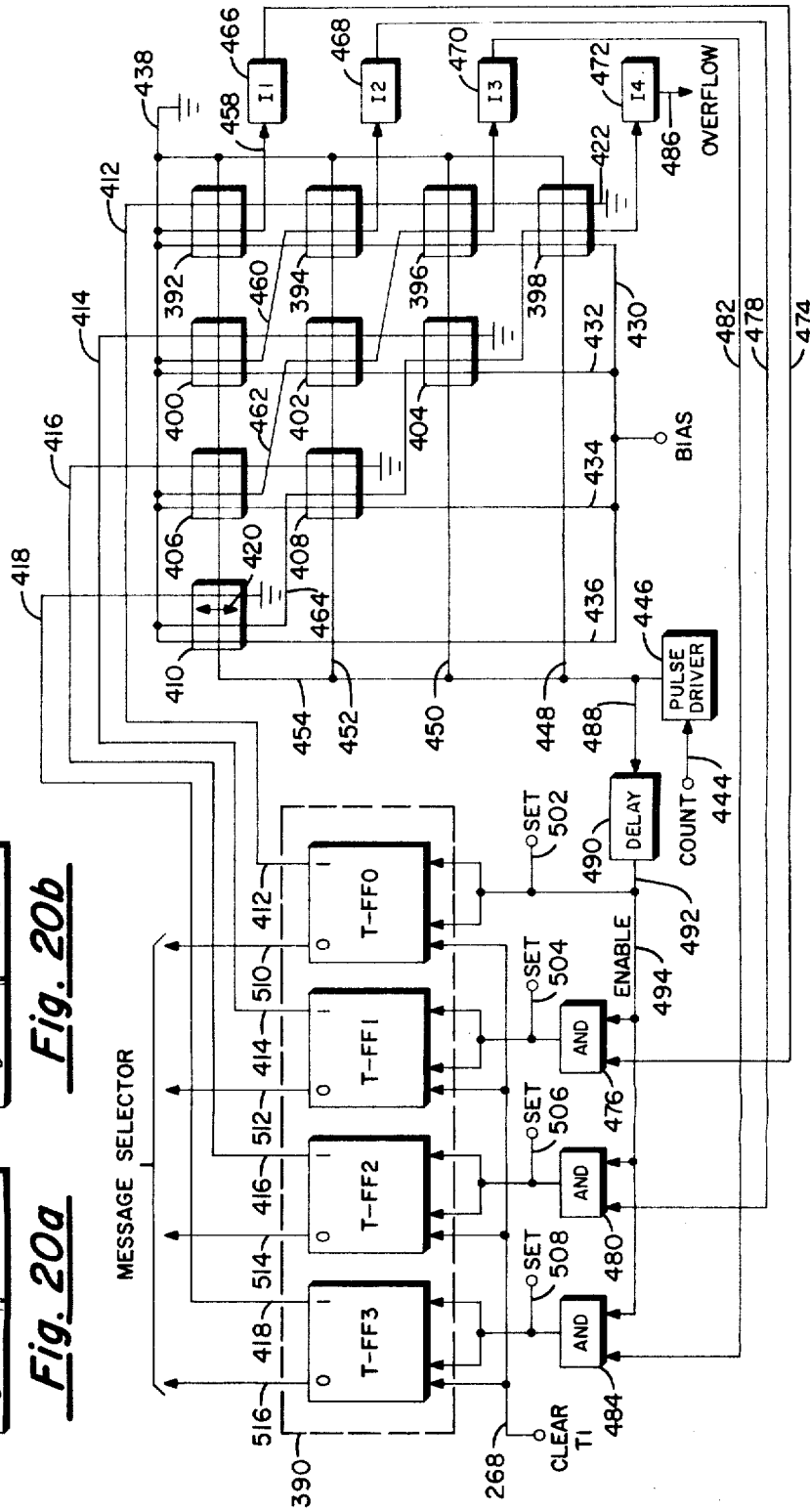
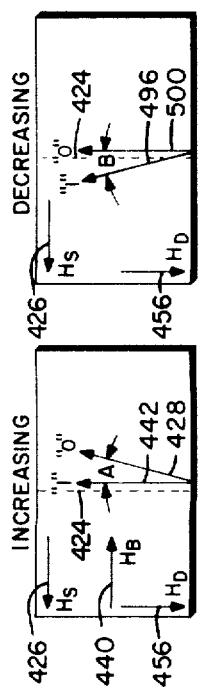
Fig. 19
Fig. 20a  INCREASING
Fig. 20b  DECREASING

United States Patent Office 3,360,778
Patented Dec. 26, 1967

3,360,778
SELF-ADAPTIVE ENCODING AND DECODING SYSTEM
Edward Jack Farrell, St. Paul, Minn., assignor to Sperry Rand Corporation, New York, N.Y., a corporation of Delaware
Filed Mar. 18, 1963, Ser. No. 265,703
21 Claims. (Cl. 340—172.5)

This invention relates generally to systems for decoding coded messages. More particularly it relates to a self-adaptive decoding system which learns gradual changes made in the encoding system so that no decoding key need be provided when it is desired to change the encoding system.

Introduction

Prior art decoding systems have been provided with means for changing the decoding operation, but these systems have required keying information to allow the decoding apparatus to accommodate the new coding technique. This "keying" normally takes a form of arbitrary signal arrangements which are recognized by the decoding apparatus to represent instructions and control parameters as to how the system must be altered to continue to correctly decode the received messages.

In any system of data transmission where a high degree of privacy is required, such as in the transmittal of military communication or of sensitive business information, it is desirable that if the signals are intercepted for a sustained period, that they do not indicate a recognizable pattern which can be utilized to "break" the code. Additionally, it is desirable not to have keying signals transmitted, since this provides a means for quantizing intercepted messages such that it can be recognized that various coding techniques are being employed.

In addition to changes in the coding technique, it is desirable that the decoding system be able to correctly decode messages which have been altered due to the injection of noise signals. Prior art error detecting systems do not normally differentiate among the various types of errors which can occur. In systems utilizing information in coded impulse form, the momentary appearance of a noise pulse among the signals being inspected by the decoder causes the detector to indicate an error. An error could be indicated, for instance, if an information pulse is slightly below the response threshold of the detector or if the detector should miss an information pulse for some reason, or if selected ones of the information pulses are actually altered due to the injection of noise signals. In these prior art machines, indicaiton of an error is usually accompanied by halting the operation of the system, and requires subsequent correction of the indicated error by an attending operator. This causes valuable time of both the system and of the operating personnel to be wasted in correcting such errors. It is desirable, therefore, to provide a decoding apparatus which will continue to function and decode correctly even though noise is present in the received message signals.

The prior art decoding devices normally treat each message identically. Therefore, during periods of high noise and the like, incorrect decoding may result, or transmission may have to be halted entirely. When it is known that the messages of a predetermined class of messages have different probabilities of occurring, it is desirable to enhance the decoding system by adding weight factors to be considered in the decoding process for each message type, thereby aiding in obtaining decoded messages which are "most likely" to be correct. By adding these statistical parameters into the decoding apparatus, the periods when correct decoding is absent diminishes, and the periods when transmission must be halted altogether are virtually eliminated.

Objects and figures

It is therefore a primary object of this invention to provide an improved message identifying system.

A further object is to provide an improved message identifying system for use in secrecy data transmission systems.

Still another object is to provide an improved message identifying system which decodes messages in response to received message signals.

Yet another object is to provide a decoding system which is adaptive to changes in the encoding system.

Still a further object is to provide an improved decoding system which is self-adaptive to changes in the encoding system without requiring keyed control messages.

Yet a further object is to provide a signal responsive decoding system which will correctly decode digital message signals which have been subjected to change due to injection of noise signals during transmission.

Still a further object is to provide a signal responsive decoding system which will decode received digital message signals at input rates without requiring intermediate storage.

It is a further object of this invention to provide a signal responsive decoding system which utilizes a digit-by-digit comparison between the digits of a received message and the digits of stored nominal codes to provide a set of operands which indicate how close the correlation is between the received message and each of the stored nominal codes to permit the selection of the message.

Still a further object is to provide a system of enhancing the decoding capability of a decoding system by providing a set of precalculated weight values which are determined by the probability of the message occurring and the probable noise that will be encountered during transmission, where the respective weight values are combined with the digit-by-digit comparison of the received message digits and the stored digits of the nominal codes to yield a set of resultant operands which can be evaluated to determine which message type was received.

Yet another object is to provide a self-adaptive signal responsive decoding system which maintains a history of detected variations between a message as received and a selected nominal code, and corrects the nominal code to reflect detected changes upon receipt of a predetermined number of such detected variations.

Another object is to provide a real-time control for monitoring a history of detected variations between a message as received and a selected nominal code made by a self-adaptive decoding system, to allow periodic clearing of the detected difference-histories to forestall the alteration of a nominal code due to an accumulation of noise signals.

Still a further object is to provide an improved method of self-adaptive decoding of messages.

The objects of this invention are realized by providing a set of coding and decoding parameters at the sending and receiving stations of a data transmission system. The decoding system evaluates received messages in view of the prestored parameters to select and indicate which message type was received. The system further provides for allowing the encoding technique to be altered without providing the decoder with an indication of such change. This consists of providing a history of detected variations between received messages and the prestored parameters, such that when a predetermined number of these variations have accumulated, the initially determined parameters are altered to reflect the change. This system operates to simultaneously decode on a "best-fit" basis while learning the changes in encoding parameters such that a transmission system requiring secrecy can be maintained.

The above and other more detailed and specific objects will be disclosed in the following specification, reference being had to the accompanying drawings, in which:

FIG. 2 is an electrical schematic diagram of the NOR logic circuit utilized in the preferred embodiment;

FIG. 3 is the logic diagram symbol for the basic logical NOR circuit used in describing the exemplary embodiment of this invention;

FIG. 4 is the truth-table for the NOR circuit, and is accompanied by the definitive logic equations for the device;

FIG. 5 is a logic diagram of an embodiment of a Flip-Flop which is comprised of two cross-coupled NOR circuits;

FIG. 6 is the logic diagram symbol which represents the cross-coupled NOR circuit Flip-Flop, and is used in the exemplary embodiment of this invention;

FIG. 19 is a logic diagram of a reversible counter utilized in performing the calculation of the correlation value;

FIG. 20a and FIG. 20b are vector diagrams which indicate the operation of the magnetic fields in the increasing and decreasing modes of counting for the correlation value counter;

Figure 1:
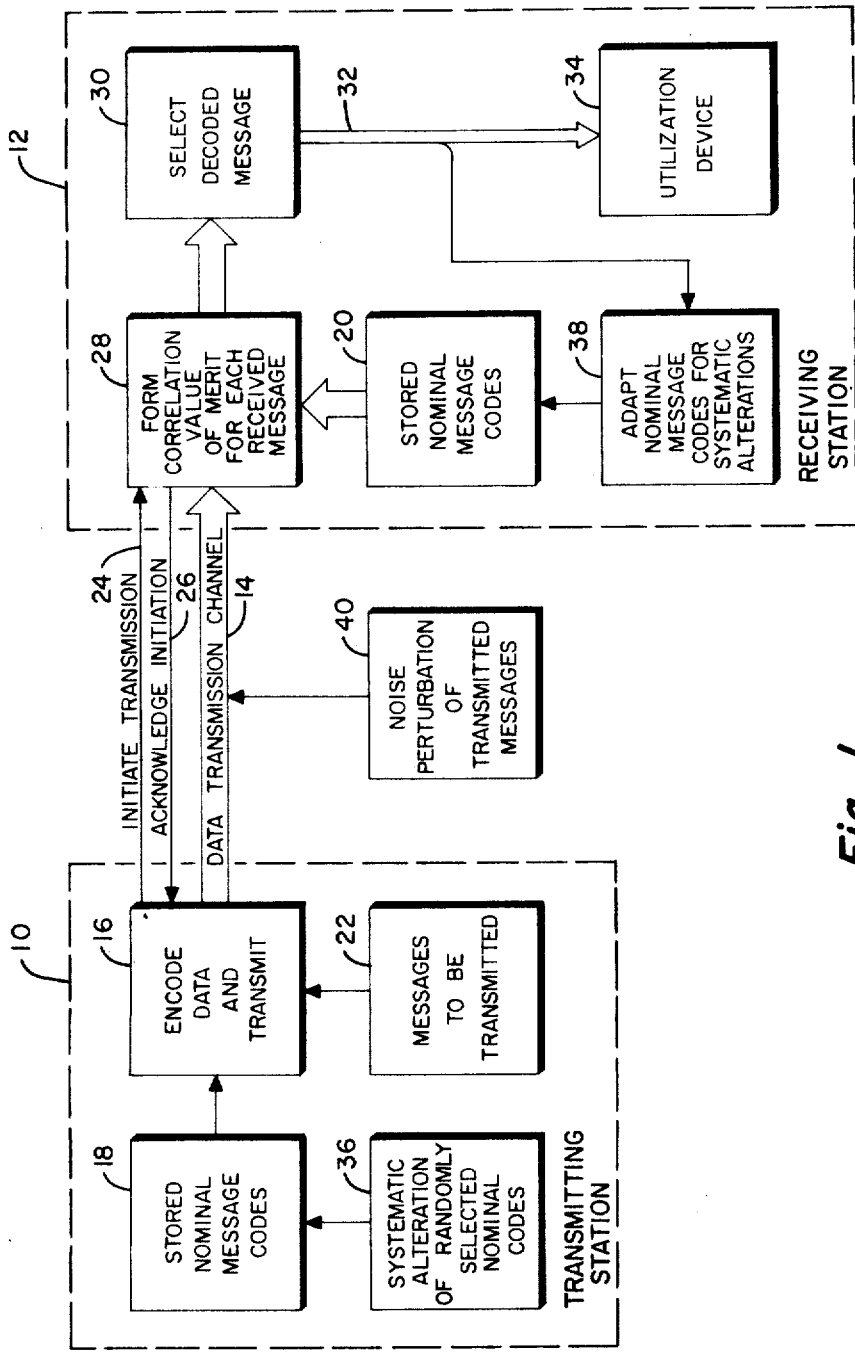
FIG. 1 is a block diagram of a data transmission system embodiment of the concepts of this invention.

The invention will appear more clearly from the following detailed description when taken in connection with the accompanying drawings of the preferred embodiment of the inventive idea. The teachings of this invention are applicable to digital devices in general, but the description contained herein will be limited to binary apparatus.

*System considerations*

Since the only two digits used in the binary system are "0" and "1," it is a system readily adaptable to electronic expression by the presence or absence of electric pulse signals. For this embodiment, the presence of a pulse is defined as a logical "1," and the absence of a pulse is recognized as a logical "0," the voltage levels being −3 volts and 0 volts respectively.

The information contained within a grouping of binary digits (bits) may represent a numerical value, or an arbitrary combination meant to convey non-numerical information. The technique used to represent numerical data consists of the well-known system of positional notation, and is characterized by the arrangement of digits in sequence with the understanding that successive digits are to be interpreted as coefficients of successive powers of the base (radix) of the number system being employed; in the binary number system, the successive digits are intepreted as coefficients of successive powers of 2. For instance the binary number 01011 would be understood to mean:

$$0(2)^4 + 1(2)^3 + 0(2)^2 + 1(2)^1 + 1(2)^0$$

The technique of utilizing an arbitrary combination of digits, as applied to the binary number system, to represent non-numerical information is well-known, and may be exemplified by the digital coding of alphabetic information. For example, the letter "a" may be represented by the binary digit grouping 01101. The latter operation is often referred to as "encoding" the information content of the data into digital representations, and is utilized to facilitate the use of digital apparatus to process non-numerical data. This invention utilizes both of the above described uses of bit groupings in that digit groupings are transmitted, and numerical values are used in the decoding system. The apparatus which embodies this invention utilizes statistical decision theory to solve the general problem of decoding binary coded messages in the presence of noise perturbation of the message signals. The basic operation of the self-adaptive decoder is identification of sequences of binary digits with one of several fixed items, which may be quantitative or qualitative.

It appears desirable at the outset to consider decoding in general and some basic definitions which will carry throughout the remainder of this description. The objective is to provide adaptive decoding of "$n$" messages, where a "message" is defined as the smallest unit of data to be transmitted, e.g., each letter of the alphabet would be a separate message for transmission of text material. For purposes of symbolic representation, these messages will be denoted—

$m(1)$
$m(2)$
.   .   .   .   .
$m(n)$

Having determined the list of allowable messages, they are coded into a sequence of binary digits, each code having "$j$" digits. This is the process described above of representing nonnumerical data as arbitrary sequences of digital pulses. The resulting codes are represented symbolically as follows—

$c(1)$ is the code for $m(1)$,
$c(2)$ is the code for $m(2)$,
. . . . .
$c(n)$ is the code for $m(n)$ This yields a condition where the following relationship must be maintained:

$$n \leq 2^j$$

The above describes the relationship between the number of messages "$n$" and the number of binary digits "$j$" required to represent these messages.

The number of binary digits required to express each of a set of messages is increased as the removal of the codes increases, where "removal" is defined as being the minimum number of digits that must be altered in any one code to have the resultant digit configuration look exactly like another code in the set. For example, if the letters A, B and C comprise the set of messages, and a removal of three is desired, the following codes, without being exclusive, will fulfill the requirements:

$$A = 01010$$
$$B = 01101$$
$$C = 10110$$

Forming the logical sum or Exclusive-OR, the function being symbolized as $\oplus$, of any two message codes and counting the resultant number of 1 digits will yield a number which represents the removal between the two codes. This operation for the example yields—

```
    A  01010        A  01010        B  01101
 ⊕  B  01101     ⊕  C  10110     ⊕  C  10110
    -----           -----           -----
    00111           11100           11011
```

This illustrates the A differs from both B and C by three digits, and B differs from C by four digits. Thus, it can be seen that a random or intentional permutation of a digit in the A code will result in a digit grouping which still "looks more like" an A code than any of the other permissible code groupings. From the examples of the logical sums of the codes, it can be seen that the lowest ordered three digits of A would have to be altered to arrive at a B code, and vice versa; the highest ordered three digits of A would have to be altered to arrive at a C code, and vice versa; and both the upper two and lower two digits of B would have to be altered to arrive at a C code, and vice versa.

For the following discussion, assume a distinct unknown message, designated "$x$", is received as a sequence of $j$ digits. Further, assume that $P_i(x)$ represents the probability of receiving $x$ where the $i$th message code $c(i)$ was sent. The value which represents $P_i(x)$ is determined from the message codes $c(1), c(2) \ldots c(n)$, and the nature of the digit perturbation due to noise injected during the transmission. Finally, on the basis of the received message $x$, one of the permissible messages $m(1), m(2) \ldots m(n)$ is selected using a prescribed decoding technique.

There are several measures of utility which may be applied to decoding techniques generally. Three of these measures are tabulated below:

(1) The average probability of correct decoding;
(2) The probability of correct decoding for "least favorable" messages; and
(3) The probabilities of correct decoding which are in a fixed ratio.

These will be considered generally in order in the following paragraphs.

The average probability of correctly decoding a received message $x$ depends on the probability of sending message $m(i)$, designated $L_i$; and the probability of selecting $m(i)$ as the proper message when $m(i)$ is sent and when decoding technique D is used, designated $p_i(D)$. The average probability, then, follows the relationship—

$$\sum_{i=1}^{n} L_i p_i(D)$$

The probability of correct decoding for "least favorable" messages is—

$$\min.\{p_1(D), p_2(D) \ldots p_n(D)\}$$

The third measure of utility enumerated above is of a different nature than those just discussed. In certain applications it is desirable to have the probabilities of correctly selecting the messages in a certain ratio; e.g., $$w_1 p_1(D) = w_2 p_2(D) = \ldots w_n p_n(D)$$

and in this relationship the $w_i$'s are positive.

These measures of utility lead to decoding techniques that have the same form and differ only in the value of certain parameters.

$D_L$ technique—
(1) If X is received and $$w_i L_i p_i(X) = \text{Max}\{w_1 L_1 p_1(x) \ldots w_n L_n p_n(X)\}$$

(2) Select $m(i)$ as the decoded message

If $w_i = 1$ for all $i$ and if $L_i$ is a probability of sending message $m(i)$, decoding technique $D_L$ maximizes the average probability of correct decoding. If $w_i = 1$ for all $i$ and if the $L_i$'s are selected so that $$p_1(D_L) = p_2(D_L) = \ldots p_n(D_L)$$

then decoding technique $D_L$ maximizes the probability of correct decoding for "least favorable" messages. For given $w_i$'s, if the $L_i$'s are selected so that $$w_1 p_1(D_L) = w_2 p_2(D_L) = \ldots w_n p_n(D_L)$$

then decoding technique $D_L$ satisfies the requirement of the third measure of utility, providing all $L_i$'s are positive. These statements follow directly from accepted decision theory, and further explanatory material may be found in "Statistical Decision Theory" by L. Weiss, p. 71 ff., published by McGraw-Hill (1961).

The self-adaptive decoding technique is implemented for the condition where $w_i = 1$ for all $i$ and $L_i$ is a probability of sending message $m(i)$, and the following discussion is retricted to this situation.

If the noise perturbation of any digit is symmetrical and independent between digits, then $p_i(x)$ may be stated as follows—

$$p_i(x) = (1-p)^n (p/1-p)^{d_i}$$

where $p$ is less than one-half and is the probability a digit of the code $c(i)$ will be perturbed by the injection of noise, and $d_i$ is the number of digits of the code $c(i)$ that have been changed to form the received code $x$. From this the decoding technique $D_L$ may now be written as:

Decoding technique $D_L$
(1) If $x$ is received and $$a_i + d_i = \min.\{a_1 + d_1, a_2 + d_2 \ldots a_n + d_n\}$$

then
(2) Select $m(i)$ as the decoded message
where $a_i$ = predetermined weight calculated from $$a_i = \frac{\log L_i + n \log (1-p)}{\log (p/1-p)}$$

If the messages $m(1), m(2) \ldots m(n)$ are equally likely, then $$a_1 = a_2 = \ldots = a_n$$

The decoding technique $D_L$ results in the formation of the logical sums—

$$x \oplus c(1)$$
$$x \oplus c(2)$$
. . . . .
$$x \oplus c(n)$$

The respective counts of detected bit difference in the logical sum of the received message $x$ and the respective codes is, in each case, added to the predetermined constant $a_i$ as defined above. It then remains to select the smallest value of these combined values to select the decoded message.

For the symmetrical perturbation of digits by noise which is independent between digits, the operation of adapting by the receiving decoder consists of providing a history of the detected differences between the respective digits of the received message code $x$ and each of the stored decoding codes $c(1), c(2) \ldots c(n)$. Upon reaching a predetermined count of the number of changes detected for a digit position within a predetermined lapsed time, the self-adaptive operation of the this invention functions to correct the indicated digits of the appropriate code $c(i)$, whereby intentional permutation of the codes transmitted are automatically "learned," and adapted to.

An alternate situation exists where the bit-perturbation by noise is symmetric, but is not independent between digits. For example, if the fourth digit is perturbed, the probability that the fifth digit will be perturbed is higher than would be the case had the fourth digit been received correctly. Also, the perturbation of any given digit is independent of all other digits being received except the next preceding digit. This operation is termed "burst" perturbation activity.

In the following discussion, "$a$" represents the probability that a particular digit is perturbed provided the next preceding digit is perturbed; and "$b$" represents the probability that a particular digit is perturbed in the event that the next previous digit is received correctly. From the above consideration, the following relationship prevails—

$$P_i(X) = p' a^{n11} b^{n01} (1-a)^{n10} (1-b)^{n00}$$

Where $n11$ = the number of 1,1 pairs in $x \oplus c(i)$
$n01$ = the number of 0,1 pairs in $x \oplus c(i)$
$n10$ = the number of 1,0 pairs in $x \oplus c(i)$
$n00$ = the number of 0,0 pairs in $x \oplus c(i)$ The $p'$ can have either of two values, and depends on a design choice between treating it independently from the preceding digit, or treating it in light of the preceding digit. For purposes of this discussion, the first digit of a message is presumed to be independent from errors occurring in the last received signal, consequently $p'$ takes on two values, a first value for correct reception and a second value for incorrect reception.

Rather than evaluate the exponential function set forth above, it is more convenient to solve the relationship—

$$-\log L_i P_i(x) = \log 1/L_i + \log 1/p' + n_{11} \log 1/a + n_{01} \log 1/b + n_{10} \log 1/1-a + n_{00} \log 1/1-b$$

where in many cases the terms involving $1-a$ and $1-b$ will not materially affect the decoding.

The operation of the self-adaptive decoder with burst type bit perturbation is similar to the operation described above for simple perturbation which is bit position independent. Further, the adaptive operation is identical to that described above. In the decoding operation, instead of evaluating the sum of the calculated weight of the respective codes and the detected number of changes between the received message $x$ and the respective stored codes $c(i)$, it is necessary to evaluate the summation of the count of the bit combinations as described above. Generally, the terms involving $1-a$ and $1-b$ may be neglected. the $p'$ can be approximated by $b$ when the first digit of $x \oplus c(i)$ is 1, and neglected when the first digit is 0. In other words, the first digit of the logical sum is counted as a 0,1 pair when it is a 1, and neglected entirely when the first digit is 0. Using these aproximations, the decoding reduces to counting the number of 0,1 and 1,1 pairs in the logical sum of the received message $x$ and the message code $c(i)$.

The application of these statistical concepts will be described in greater detail in the following descriptive material dealing with the ambodiment of this invention.

Basic self-adaptive decoding system

FIG. 1 is a block diagram illustrating the operation, and the circuit elements required for the operation of this embodiment of the self-adaptive decoder. This system of transmitting data is comprised of a Transmitting Station illustrated within dashed block 10, a Receiving Station illustrated within dashed block 12, and a Data Transmission Channel 14. The Transmitting Station 10 includes circuit means for encoding the predetermined message typed and terminal means for transmitting the encoded messages, as illustrated by block 16. An initial condition for the operation of this data transmission system is that a plurality of nominal message codes be prestored in the Transmitting Station 10 as indicated by block 18, and in the Receiving Station 12 equipment as indicated by block 20. Initially these two groups are identical and define the predetermined allowable messages which may be handled by the system. In addition to the stored nominal message codes 18, the encoding circuitry 16 is responsive to the messages to be transmitted 22 as they become available. To initiate transmission of coded information, Transmitting Station 10 issues an Initiate Transmission signal on line 24. This signal is interpreted by Receiving Station 12, and in response thereto causes initializing operations to be performed. Additionally, an Acknowledge Initiation signal is issued over wire 26 to inform Transmitting Station 10 that it is ready to receive the information. When the Transmitting Station 10 receives the Acknowledge signal, data signals are immediately transmitted over Data Transmission Channel 14. As the message signals are received, Receiving Station 12 forms a correlation value for the received signals for each of the allowable message types, as shown by block 28. "Correlation value" is defined as a numerical operand which reflects the degree of difference between the message signal grouping and the stored nominal code, and may be enhanced by the addition of a predetermined weight value. When transmission of a message has been completed, the respective correlation values are examined and the appropriate message is selected as illustrated by block 30. This selection operation 30 performs the decoding and issues a signal on a predetermined wire within cable 32 to the utilization device 34. For the preferred embodiment, the respective correlation values are calculated in parallel and the following selection of the decoded message is responsive to these correlation values. An alternative decoding method is to serially form the correlation values for the message types followed by an inspection of these values to determine which message type has been received.

In addition to the encoding circuitry 16 the Transmitting Station 10 has incorporated therein a means for randomly selecting nominal message codes which may be permutated. Having selected a nominal message code to be altered, a means is provided for systematically altering said code in relation to the other stored nominal codes, as illustrated by box 36. Such an alteration in a nominal message code results in the signal configuration of 1's and 0's which now represent a particular message being different from that grouping of signals which originally represented the message. To allow the Receiving Station 12 to continuously correctly decode the transmitted message, it is necessary to provide means to adapt 38 the stored nominal message code at the Receiving Station 12 for the systematic alteration just described as being made in the Transmitting Station 10. This is accomplished by maintaining a history of the detected differences between the received message signal grouping and the signal grouping stored for the selected message. Upon reaching a predetermined value of detected differences for any message, the corresponding stored nominal message code 20 is altered to reflect this change. Since the data transmission channel 14 is subject to noise which may randomly perturb bits of any message, as shown by block 40, it is necessary to restrain alteration of the nominal message codes for a period which will indicate that in fact a permutation at the transmitting end has been made. It is necessary to distinguish this situation from that where noise is sporadically injected into the transmission channel 14. As illustrated, the Initiate Transmission signal carrying line 24 and the Acknowledge Initiation signal carrying line 26 are separate from the Data Transmission Channel 14. This is illustrative only and by appropriate modification in the Receiving Station 12, the initiate and acknowledge signals could equally as well be transmitted over the Data Transmission Channel 14.

As was described above, the information of the correlation values may be based on different criteria, but in all instances, the selection of the decoded message consists of choosing that message which is indicated to have the closest correspondency to a nominal code based on the correlation value. The Data Transmission Channel 14 may be any of the well known types of transmission links, e.g., telephone lines, radio channels, telegraph cables, etc.

*Building-block circuits*

To implement this embodiment of the self-adaptive decoder as described in conjunction with the block diagram of FIG. 1, it is felt that a description of the basic circuits employed should be presented. In FIG. 2 there is shown a schematic circuit diagram for implementing the OR-INVERTER or NOR logic. The function that this circuit performs is referred to by logicians as the Pierce function. Since other circuits can be devised performing this type of logic, the circuit illustrated schematically is only typical, and limitation thereto is not intended. The self-adaptive decoder utilizes the binary number system for its internal calculations and represents a logical "1" signal by a potential of approximately —3 volts while a logical "0" is represented by a potential of approximately 0 volts. When a 0 potential (logical "0") is presented on all of the input terminals 50, 52, and 54 the junction 56 in the circuit diagram is maintained slightly positive by means of the voltage source +V1, and the voltage divider comprised of resistors 58, 60, and 62. Since the base 64 of the transistor 66 is positive with respect to its emitter electrode 68 (maintained at ground potential), the emitter-to-base junction 72 is biased in the reverse direction. This causes the impedance between its emitter 68 and collector 70 is relatively high. The base-to-collector junction 74 is always reverse biased by means of the voltage source —V1, thereby causing the current to flow through the collector junction 74 only when the bias is reversed on the base-to-emitter junction 72. For purposes of this explanation, leakage currents are ignored. The output conductor 76 is clamped at approximately —3 volts (—V2), representing a logical "1," by the clamping diode 78 connected to the —V2 supply. Resistor 80 connected between the collector 70 and the —V1 supply is provided as a load.

In the instance when a negative potential (logical "1") signal is applied to any one of the input terminals 50, 52, or 54, the base 64 of the transistor 66 becomes negative with respect to the emitter 68. This presents the bias condition which causes a relatively large current to flow between the emitter 68 and the collector 70, such that the output voltage rises to almost ground potential, and thereby produces a signal which represents a logical "0." While only three input terminals are illustrated in a schematic diagram of FIG. 2, it should be understood that a greater or fewer number may be employed. The output 76 may be utilized to drive several other similar NOR circuits, or other types of circuits utilized in this embodiment.

FIG. 3 illustrates the logic diagram symbol 82 that is utilized to represent the basic building-block circuit illustrated schematically in FIG. 2. This block represents the NOR circuit, which may have a plurality of input terminals, such as A and B, with a single output terminal, such as C.

The truth-table of FIG. 4, with the Boolean equations that accompany it indicate that if a logical "1" signal is applied to one or more of the input terminals, the output terminal carries a signal representing a logical "0." Only with the condition where all of the inputs are logical 0's will a logical "1" appear at the output terminal.

FIG. 5 indicates the manner in which two NOR circuits 84 and 86 of the type described above may be interconnected to obtain a bistable multi-vibrator, more commonly called a flip-flop. In order to set information into the flip-flop a logical "1" is placed on the set line 88. and to clear the flip-flop it is necessary to place a logical "1" on the Clear input line 90. Referring to the truth-table of FIG. 4, it can be seen that a "1" input on the Clear line 90 will result in a "0" output on conductor 92. This output is also applied as an input on wire 96 to NOR circuit 84. Since a Set and Clear pulse may not be applied simultaneously, the input on conductor 88 will be held to a logical "0" so that when it is coupled with the "0" output of NOR circuit 86 the output from NOR circuit 84 will be switched to a "1" which appears on wire 94. To Set the flip-flop it is necessary to apply a "1" signal on Set input 88 while applying a "0" on Clear line 90, thereby resulting in a "0" on output line 94. Since this output is applied as an input on wire 98 to NOR circuit 86, there is caused to be a "1" on output line 92, and the flip-flop is Set.

For purposes of simplifying the logic diagram of this embodiment, the cross-coupled NOR flip-flop illustrated in FIG. 5 may be illustrated as shown in FIG. 6 as a single block. The notation FF will be utilized to distinguish this logic element from other types of circuits. The "1" notation at the tip of input arrow on the Set line indicates that when a Set signal has been applied, a "1" is present at the output terminal designated "1," and a "0" signal is present at the output terminal designated "0." The inverse output condition is present when a Clear pulse is applied to the Clear terminal designated at the input with the "0."

Figure 7:
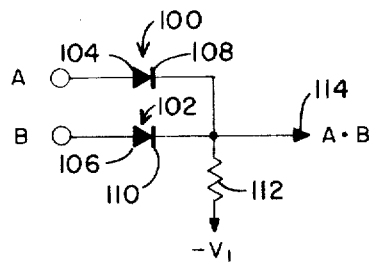
FIG. 7 is an electrical schematic diagram of a circuit which performs the logical AND function.

FIG. 7 illustrates schematically a typical diode circuit used to accomplish the logical AND function. The circuit connections are such that diodes 100, 120 have their anodes 104, 106 coupled to the input terminals, and their cathodes 108, 110 coupled in common through resistor 112 to the bias voltage —V1. The signal appearing at output terminal 114 will be a "1" only when both input A and B are "1" (—3 volts). In the event that any input line is at logical "0" (0 volts) the cathode of the related diode would be held at approximately 0 volts, thereby yielding a logical "0" output. The AND circuit will often be referred to as a "gate" circuit.

Figure 8:
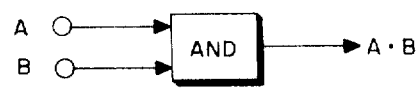
FIG. 8 is the logic diagram symbol which represents the AND function in the consideration of the exemplary embodiment.

FIG. 8 illustrates the logic diagram symbol for the AND function which will be utilized in the description of the embodiment of this invention. It will be noted that though only two inputs A and B are shown, that further inputs to the AND function are allowable.

Figure 9:
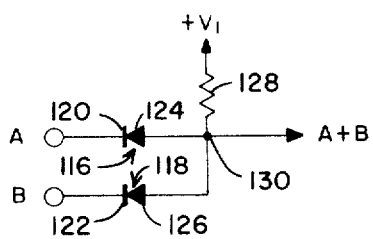
FIG. 9 is an electrical schematic diagram of a circuit which performs the logical OR connective function.

FIG. 9 is a schematic diagram representation of a typical circuit used to accomplish the OR function. It operates such that if either A or B, or both input terminals have a logical "1" (—3 volts) applied, the output will be "1". Diodes 116, 118 have their cathodes 120, 122 coupled to the input terminals, and their respective anodes 124, 126 coupled in common through load resistor 128 to voltage source +V1. Due to this circuit arrangement, the anode of any diode whose cathodes is at —3 volts will be more positive than —3 volts by the amount of forward drop of the conducting diode, which for practical purposes is negligible. Thus, for example, if input A is a logical "1", diode 116 will conduct thereby bringing common point 130 to —3 volts. If, at the same time, input terminals B has "0" (0 volts) impressed on it, diode 118 will be biased in the reverse direction (—3 volts at anode 126, hence in the non-conductive mode. Finally, if both A and B have logical "0" signals applied, output point 130 will be at 0 volts.

Figure 10:
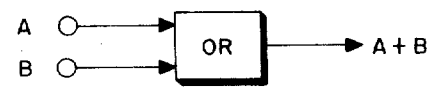
FIG. 10 is the logic diagram symbol for the basic OR circuit used in the description of the exemplary embodiment.

FIG. 10 illustrates the logic diagram symbol which will be utilized in the description of this embodiment of the invention to designate the OR function. Again it will be noted that though only two inputs A and B are illustrated, that further inputs may be utilized.

Figure 11:
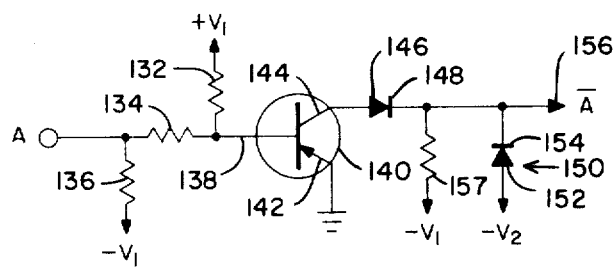
FIG. 11 is a schematic circuit diagram of an inverter circuit which performs the logical function of negation.

FIG. 11 illustrates schematically a transistor circuit which provides the inversion or negation function. Functionally the operation is such that a logical "1" (—3 volts) impressed at input A will yield a logical "0" at the output terminal. Electrically the operation is such that a —3 volts applied at A through the divider network made up of resistors 132, 134, and 136 connected in series between potential sources +V1 and —V1 will bias the base 138 of transistor 140 slightly negative. Since the emitter 142 is grounded, negative bias will cause transistor 140 to conduct to saturation thereby putting the collector 144 at essentially 0 volts. For this application the collector-emitter potential difference is assumed to be negligible when the transistor is saturated. When the condition exists that the collector 144 is at 0 volts, isolation diode 146 will be biased to conduct, hence its cathode terminal 148 will be essentially 0 volts. This condition necessarily means that diode 150 will be non-conducting because of the back bias applied from potential source —V2. When input terminal A has 0 volts applied, the base 138 will be biased more positive than the grounded emitter 142, hence transistor 140 will be non-conducting. The anode 152 of diode 150 has clamping voltage —V2 applied with the result that the cathode 154 will be at —3 volts. Since the transistor is non-conducting, this potential will be applied at the output terminal 156. Resistor 157 coupling the output terminal 156 to —V1 provides a circuit load.

Figure 12:
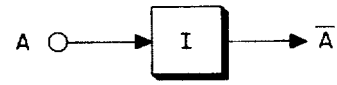
FIG. 12 is the logic diagram symbol utilized to represent the inversion function in the description of the exemplary embodiment.

FIG. 12 is a logic diagram representation of the inversion function described for the circuit illustrated schematically in FIG. 11. This logic diagram symbol will be utilized in the description of this embodiment of the invention.

Figure 13:
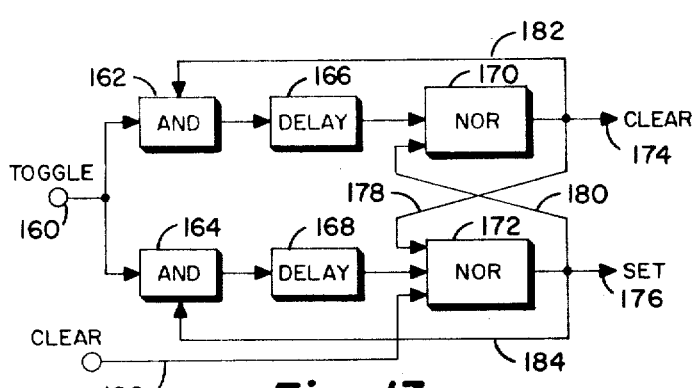
FIG. 13 is the logic diagram of a Toggle Flip-Flop comprised of cross-coupled NOR circuits.

FIG. 13 is a logic diagram representation of a memory element which is a toggle or trigger type flip-flop. The circuit comprises an input terminal 160 coupled in common to a pair of AND circuits 162, 164 which in turn drive delay elements 166 and 168 respectively. The delay elements 166, 168 apply their respective outputs to NOR circuits 170 and 172. By convention, when NOR circuit 170 provides a "1" output signal, the toggle flip-flop is said to be cleared. Likewise, when NOR circuit 172 provides a "1" output signal on line 176, the toggle flip-flop is said to be Set. In a manner similar to that described for the bistable flip-flop of FIG. 5, the outputs of the respective NOR circuit 170, 172 are cross-coupled so that the output signal from NOR circuit 170 is applied as an input over wire 178 to NOR circuit 172, and the output signal of NOR circuit 172 is applied over wire 180 as an input to NOR circuit 170. To complete the circuit arrangement of the toggle flip-flop it is necessary that the respective output signals also be directed to AND circuits 162, 164. This is done by coupling the output of NOR circuit 170 with wire 182 to AND circuit 162, and coupling the output of NOR circuit 172 with wire 184 to AND circuit 164. The operation of a toggle flip-flop is well known in the art, and is such that when the common input line is energized, it causes a toggle flip-flop to reverse states. This may be distinguished from the flip-flop described in FIG. 5 wherein it requires an energizing pulse on one of two possible input lines to cause it to change states. For purposes of describing the operation of this illustrative embodiment, assume that NOR circuit 170 is providing a "0" output and NOR circuit 172 is providing a "1" output (the flip-flop is Set). Next assume that a toggle input (logical "1") is applied to input terminal 160. This signal will be applied simultaneously to AND circuits 162, 164. It will be noted that the "0" output from NOR circuit 170 applied on wire 182 will disable AND circuit 162; while the "1" output from NOR circuit 172 will be applied on wire 184 to enable AND circuit 164. This causes a "1" signal to be applied to the delay element 168, and thereafter to NOR circuit 172. From the truth-table described in FIG. 4 it will be seen that a "1" input to the NOR circuit, such as NOR 172, will result in a "0" output, irrespective of the input from the other elements. Recalling that input levels are maintained at the as "0" less pulse by a "1" signal, the "0" signal now appearing on output line 176 will be applied over cross-coupling wire 180 as a "0" input to NOR circuit 170. This is in addition to the other inputs clamped at the "0" level, which results in all of the inputs being of the "0" value, causes NOR circuit 170 to be conditioned to provide a "1" pulse at its output terminal 174. It will be noted that the delay of the input pulse induced by delay elements 166, 168 is such that the toggle-input pulse applied at input terminal 160 has returned to its "0" state prior to the effective feedback from the switch circuit to enable the appropriate AND circuit. In addition to the toggle input 160, the toggle flip-flop is provided with a Clear input 186 which is applied to NOR circuit 172, to provide a means for Clearing the toggle flip-flop for an initializing condition. When the Clear line 186 is activated (as by coupling to negative voltage), the logical "1" causes NOR circuit 170 to be switched to a condition to output a logical "1", and the flip-flop is Cleared.

Figure 14:
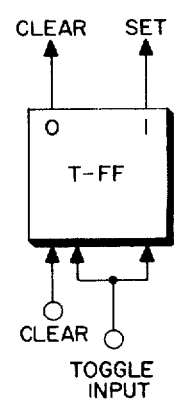
FIG. 14 is the logic diagram symbol for the Toggle Flip-Flop used in the description of the exemplary embodiment of this invention.

FIG. 14 is a logic diagram symbol which will be utilized to represent the logical elements described in combination in FIG. 13, and the terminology T-FF will be applicable to each such circuit to differentiate it from the bistable flip-flop (FF) element described in FIG. 6. When applicable, the Clear line will be shown as a separate input to the toggle flip-flop.

The registers employed in the illustration of this embodiment are comprised of groupings of either the bistable flip-flops illustrated in FIG. 6, or the toggle flip-flops illustrated in FIG. 14.

*Decoding and self-adaptation*

Figure 15:
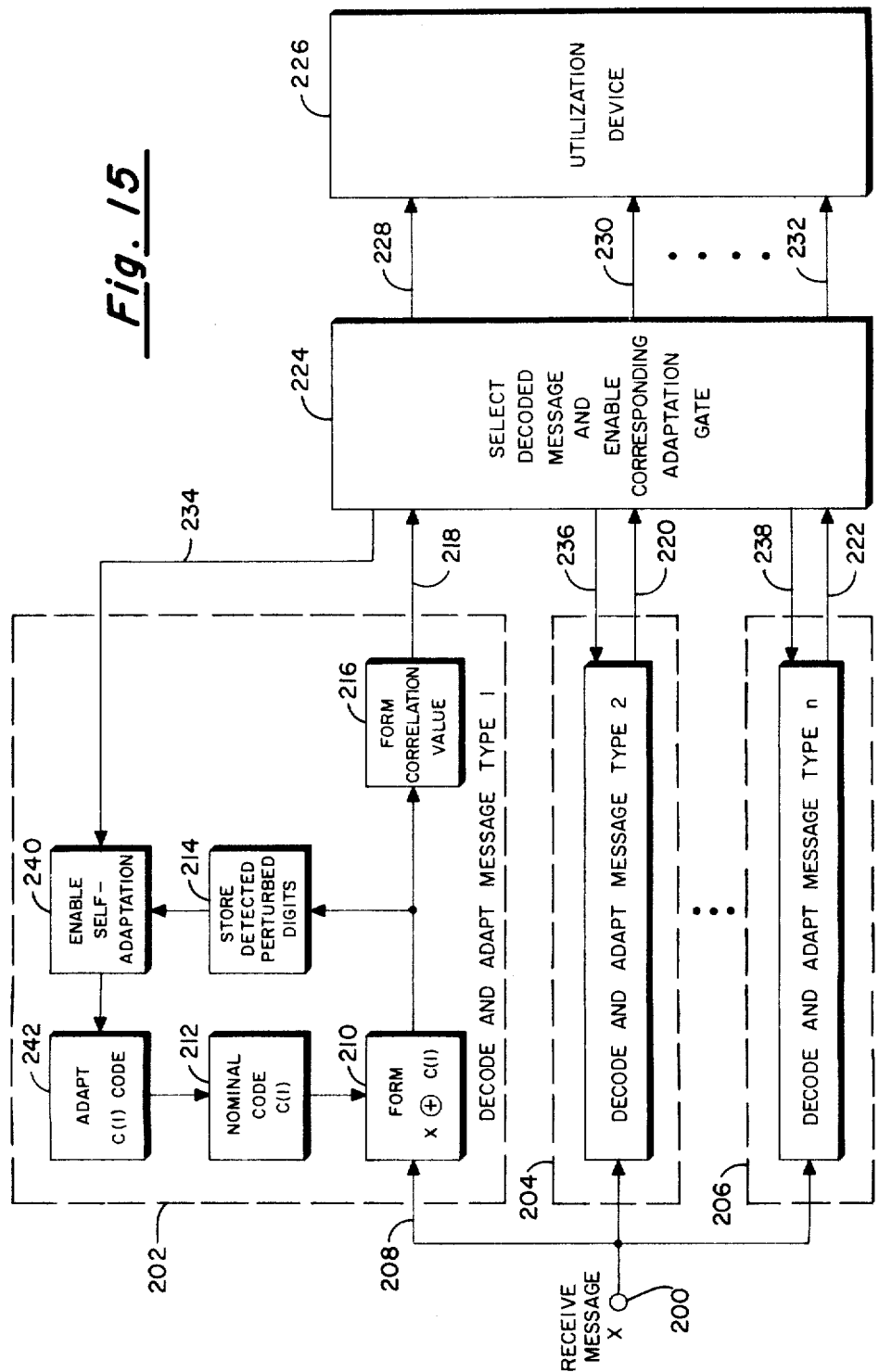
FIG. 15 is a logic diagram of an embodiment of the self-adaptive decoder which incorporates the teaching of this invention.

FIG. 15 is a logic diagram which illustrates for one message type the steps in decoding a received message $x$. The input terminal 200 is coupled in parallel to each of the decoder circuits shown in dashed boxes 202, 204, and 206, and is identical for each message type. As was described above, the message types are predetermined and have nominal codes $c(l)$ through $c(n)$ initially stored in the receiving apparatus. A further requirement is that the basic weight factor, which is utilized in calculating the correlation value for each message type, be precalculated according to the formula described above and prestored as a decoding parameter.

The serially received message signals $x$ are applied over wire 208 and applied sequentially for this embodiment to logic circuitry which forms the bit-by-bit Exclusive-OR (logical sum) 210 between the received message signals and the stored nominal code 212. This operation is synchronized and will be described in detail below. As the operation is performed, two further operations are performed. The first of these is to store the bit-by-bit logical sum in a retaining register 214, and in effect gives a record of the digits which are detected as being different from the nominal code. The other occurrence which follows the formation of the bit-by-bit logical sum is that the respective correlation values are formed 216. For decoding messages where the digits are treated independently, a correlation value is formed by adding 1 to the basic weight value for each occurrence of the detection of a difference between a received input digit and the corresponding digit of the nominal code. For the alternate embodiment where burst errors are encountered, as described above, and the errors are dependent on the occurrence or nonoccurrence of an error in the next preceding digit position, the correlation value is formed by counting 0,1 and 1,1 combination in the operand which results from the Exclusive OR operation, and adding these counts to the corresponding precalculated weight factor. In either embodiment this operation goes on in parallel for each of the message types which have been predetermined. When it is determined that the message being received has been completed, the respective correlation values are transmitted over wires 218, 220 and 222 as inputs to circuitry which will therefrom select the decoded message, as shown in block 224. The operation of selecting the appropriate decoded message type from the correlation values consists of comparing the correlation values one to another and selecting the lowest value (closest match). Upon determining which of the message types has been received, an output signal is presented to a utilization device 226 over control wires such as 228, 230, or 232.

A further operation to be performed after the message has been decoded consists of providing the self-adaptation enable signal to the adaptation stage which corresponds to the received message over a wire such as 234, 236, or 238. The occurrence of this enable signal at the self-adaptation enable 240 results in the stored configuration of detected perturbed digits being passed into the nominal code adapter 242. The operation of the code adapter 242 consists of providing for each digit in the particular message code a history which consists of a count of all occurrences of detected differences in the respective digit positions between the digits received and corresponding digits of the nominal code. Upon reaching a predetermined value for any digit position, the code adapter 242 operates to correct the associated digit of the nominal code. For this embodiment this correction consists of complementing the digit of the nominal code. It is this updating of the nominal codes after a predetermined number of detected changes in the respective digit positions that allows the coded messages being sent to be intentionally gradually changed, while allowing the receiving apparatus to operate continuously to correctly decode without requiring the transmittal of keying information to indicate when the codes are being changed.

Timing and control

Figure 16:
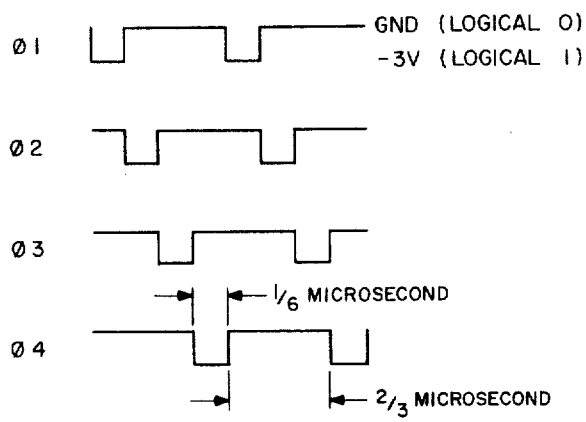
FIG. 16 illustrates the exemplary clocking pulses utilized to perform the timing of the self-adaptive decoder.
Figure 17:
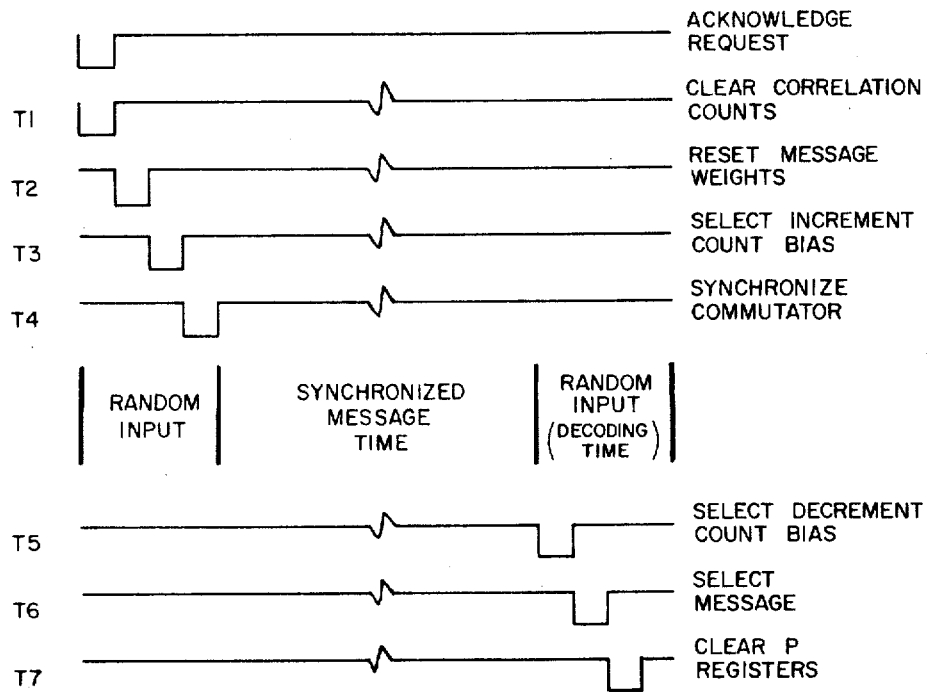
FIG. 17 illustrates the exemplary control pulses and the timing relationships necessary to process one message.

In this embodiment there are three basic types of control signals. The primary control signals are the Clock signals as illustrated in FIG. 16. These are repetitive and always occur in the same time relationship one to another. The control section (to be described in more detail later) of the self-adaptive decoder is made up of circuitry which effects the carrying out of the decoding operation in proper sequence. This class of control signal is illustrated in FIG. 17, and is derived from the Clock signals. These are normally cyclically reoccurring, but the normal period of reoccurrence will be varied according to the time necessary to receive one message code, that is, the longer the message the longer the Synchronized Message Time. Therefore, this type of control pulse is distinguishable from the Clock Control Pulse in that they may occur in a varying cyclic time depending upon the message length, whereas Clock pulses are always in the same time of cyclic reoccurrence with relation to one another. The third type of control signal is one which may be derived from data signal manipulation in an asynchronous operation, where the result of the decoding reaching a given point in the logic circuitry starts, or enables the next sequence of operation. This type of control is characterized by its ability to allow calculation to proceed at the maximum rate allowable by the components delay losses. This invention employs all three of the above described types of control, and in some instances may require the simultaneous occurrence of all three in order to control the proper sequencing of operation. A description of the utilization of the various control pulses will be made as the need arises in the following description.

Figure 18:
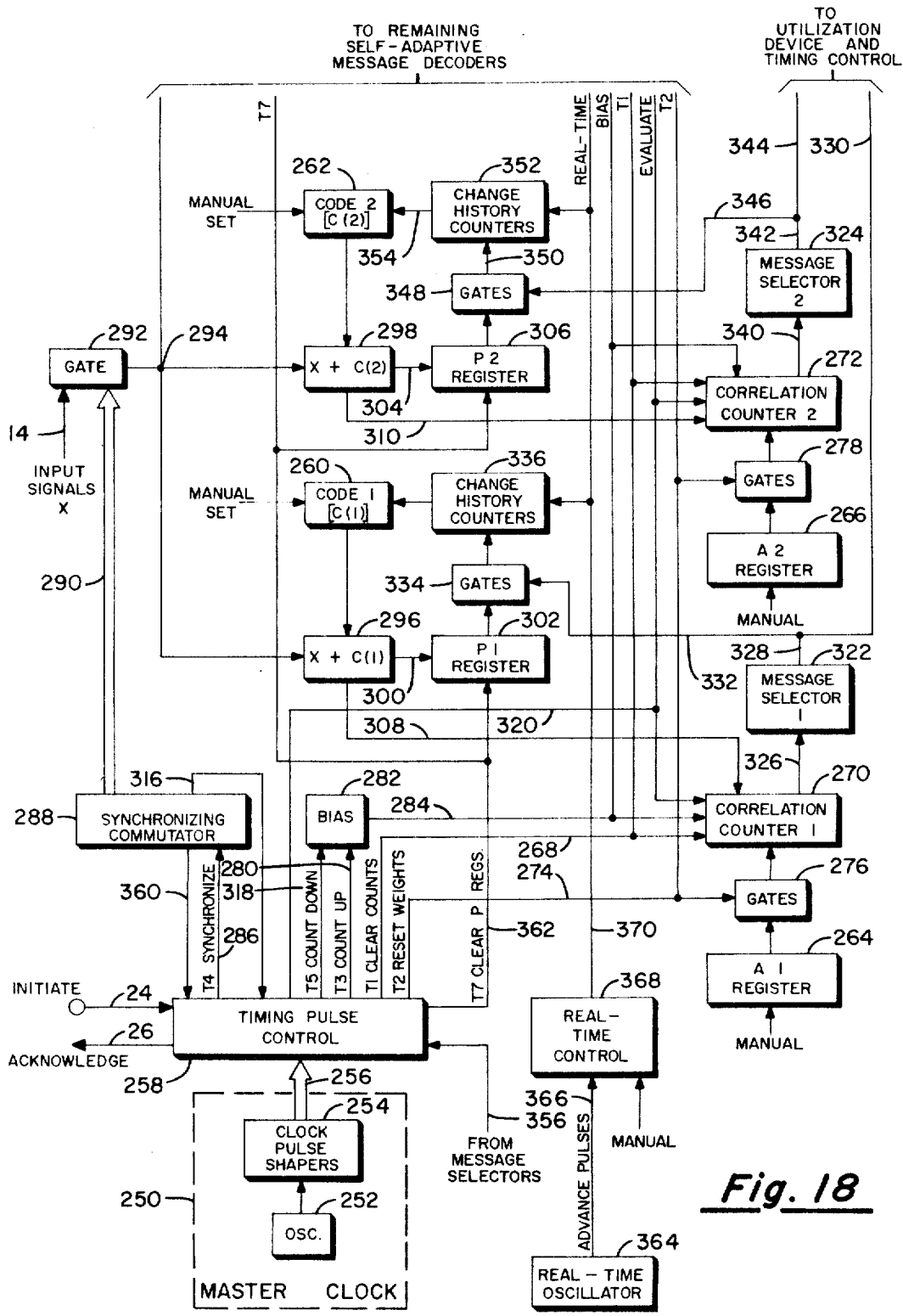
FIG. 18 is a logic diagram of an embodiment of the self-adaptive decoder which illustrates parallel decoding and the generation and utilization of the timing pulses.

FIG. 18 is a block diagram illustrative of the operation and timing control within Receiving Station 12. The registers are labeled as such, and the other blocks illustrated represent logical operations required to achieve the objects of this invention.

The Master Clock illustrated in dashed block 250 consists of the Master Oscillator 252 and its associated Clock Pulse Shapers 254 which provide cyclically reoccurring time pulses as illustrated in FIG. 16. These clock pulses are applied over cable 256 as inputs to the Timing Pulse Control 258, and provide the basic timing described above. The Timing Pulse Control 258 is responsive to the Initiate Transmission signal received on wire 24, and the clock pulses as received on cable 256 to provide the basic timing steps which control the sequences of decoding. These timing signals and their respective relationship are illustrated in FIG. 17, and comprise the acknowledge signal transmitted on wire 26 in response to the Initiate Transmission signal, and the T1–T7 pulses which will be described as they are utilized. The internal operation of the Timing Pulse Control 258 section will not be described in detail sinceot it is comprised of timing chains of the type well-known in the art which may be constructed of controlled ring counters of the appropriateo number of stages, and since it would not tend to clarify the operation of the invention.

The registers shown in FIG. 18 are of a type well known in the art and basically comprise a plurality of flip-flops, either the bistable or toggle types, which are utilized for temporary storage of information.

Before the self-adaptive decoder can function, it is necessary that certain input parameters be supplied. These consist of manually setting the nominal codes, such as C(1) labeled 260 and C(1) labeled 262. It will be seen that though these nominal codes are described as being manually settable, they may be electronically set by methods well known in the art. Another set of input parameters which must be supplied comprises the respective weights of the predetermined set of messages as determined by the formula described above. These values are manually entered into the A1 Register 264 for the message Type 1, and the A2 Register for message Type 2; this operation being repeated for the remainder of the A Registers.

Having preset the initial parameters required for operation, the operation of the self-adaptive decoder may be started by receiving an Initiate pulse on input line 24. After issuing the Acknowledge pulse on output line 26, the Timing Pulse Control 258 issues the T1 control pulse on line 268. The T1 pulse operates to clear a set of counters, such as correlation counter 1 labeled 270, and correlation counter 2 labeled 272. Having cleared the correlation counters which function with each of the message decoders, the Timing Pulse Control 258 issues the T2 pulse on wire 274, which operates to enable the gates 276, 278, to permit the manually preset weight values to pass from the respective A Registers into their associated correlation counters thereby satisfying a required initial condition. Having initialized the respective correlation counters 270, 272, the Timing Pulse Control 258 issues control pulse T3 on wire 280 whereby a constant current bias supply 282 is selected to provideot an incremental mode of operation on control line 284 to the correlation counters 270, 272.

Having initialized the weight values for each of the respective message types, and having selected the count-up bias for the correlation counters, the Timing Pulse Control 258 operates to issue a control pulse T4 on wire 286 which cases the Synchronizing Commutator 288 to be synchronized to an initial condition. The Synchronizing Commutator 288 comprises a circulating ring counter which operates to sequentially issue control pulses on cable 290 which are utilized to sequentially enable individual ones of gates 292. This allows each digit of the serial input signals which comprise the message $x_i$ as received on input line 14, to be directed in parallel to all of the decoders on conductors 294.

The operation is such that the Synchronizing Commutator 288 is initialized to first enable the lowest ordered input pulse into the circuitry which provides the bit-by-bit Exclusive-OR with the corresponding digit of the stored nominal codes, as shown by blocks 296 and 298. The Synchronizing Commutator 288 then operates to sequentially gate in successively higher ordered digits of the input message. Upon detecting a difference between the input signal and the associated digit of the nominal code, such as the ($C_1$1) code labeled 260, an output signal is provided on wire 300 to set the appropriate stage of the P1 Register 302 whereby a record of detected differences is maintained. In a similar fashion, if the Exclusive-OR circuitry associated with message type 2 labeled 298 detects a difference between the input signal and the associated stage of nominal code 2 as stored in storage register 262, an appropriate signal is transmitted over wire 304 to set the corresponding stage of the P2 Register 306. When the Exclusive-OR circuitry associated with message type 1 labeled 296 determines that a difference exists between one digit of the input message and the corresponding digit of the nominal code, a signal is also provided on wire 308 to increment the correlation counter 270 associated with message type 1. Likewise, when Exclusive-OR circuitry 298 associated with message Type 2 detects a similar difference between the received input digit and the corresponding digit of nominal code C(2) 262, it provides an appropriate output signal on wire 310 to increment the correlation counter 272 which is associated with message Type 2. This operation continues with the respective correlation counters 270, 272, being incremented for each digit in which the Exclusive-OR circuitry determines that a difference exists between the stored code and the respective digit of the input message. Similar circuit arrangements comprised of the Exclusive-OR circuitry and the correlation counters is provided for each message type.

The Synchronizing Commutator 288 operates to time each digit of the input signal and apply it to the Exclusive-OR circuitry 296, 298, and further operates to determine the number of diigts of the input signals which will be recognized as usable data. Upon reaching a predetermined count which corresponds to the number of digits in an input message, the Synchronizing Commutator 288 operates to issue a control signal on wire 316 which initiates the evaluation of the correlation values by a signal on lead 320. At this time, the Synchronizing Commutator 288 continues for a predetermined number of extra count periods such that randomly applied input signals applied to terminal 14 will not be gated into the Exclusive-OR circuitry. This period in which randomly applied input signals are ignored, allows for a higher degree of secrecy in that no start-mark nor stop-mark pulses are required to indicate the bounds of a particular message, but instead allows the receiving station to control its acceptance of input data by strict control of the timing. This operation will be described in more detail below.

When the Synchronizing Commutator 288 has counted to a point which indicates that a complete input message has been received, it issues a signal on wire 316 which is operative to enable the evaluation of the correlation values by providing an input to the Timing Pulse Control 258 circuitry. The Timing Pulse Control 258 is operative in response to the pulse received on wire 316 to issue the T5 count-down control pulse on wire 318. This operates to switch the bias 282 whereby the correlation counters 270, 272 are set to a mode of operation to decrementally count rather than count incrementally. Having set the correlation counters to decrementally count, the Timing Pulse Control 258 issues pulses sequentialy on wire 320 whereby the correlation counters are continually decreased until one of said counters reaches zero value. It will be recalled that in the general discussion above wherein the correlation value for the respective messages was described, that the message to be selected is that one represented by the lowest valued count of the combination of its weight factor with the additional count of any digits determined to be different between the stored nominal code and the associated digit of the input message. By counting down the correlation counters, the first counter to pass to zero will determine the message to be selected. Correlation counter 1 labeled 270 is associated with message selector 1 labeled 322, and correlation counter 2 labeled 272 is associated with message selector 2 labeled 324. Each of the message selectors 323, 324 comprise a NOR Circuit responsively coupled to each state of its associated correlation counter. Correlation counter 270 provides inputs from each of its stages on cable 326 to message selector one labeled 322 such that when all of the stages of the correlation counter store zero values a "1" signal will be provided on line 328. The "1" signal provided on wire 328 is transmitted on wire 330 as an output to the utilization device and thereby indicate when message type 1 has been selected. This same signal is also set on wire 332 as an enable to the gates 334 which allow the digits detected to be different from the corresponding digits of the stored nominal code. These digits are stored in the P1 Register 302, and upon selection of message type 1 will be gated into the change history circuitry 336. The change history circuitry is comprised of a counter for each of the digits permissible in the message. Upon reaching a predetermined value, the respective digits designated by the change history 336 are operative to adapt the stored code C(1), as indicated by block 260, by toggling the corresponding digit. In the event that message selector 2 labeled 324 is the first NOR circuit to be actuated by its associated correlation counter 272 via cable 340, an output signal is issued on wire 342 which is fed on wire 344 to the utilization device thereby designating that message type 2 has been decoded. As was described above, the message selector output signal is provided on wire 346 to enable gates 348 to permit the detected changes to be fed on wire 350 into the Change History Counters 352. Again as was described above, upon reaching the predetermined value the Change History Counters 352 provide signals to the respective digits of nominal code 2 labeled 262 on wires 354 to adapt the nominal code to reflect detected changes.

The first message selector 322, 324 to detect that its associated correlation counter has reached zero in the countdown process operates to provide an output signal indicating the message code selected. Additionaly, a signal is applied from the output message selector which indicates the message decoded on cable 356 as an input to the Timing Pulse Control 258. In response to this signal, which indicates a message has been decoded, the Timing Pulse Control 258 operates to disable the pulses being provided on wire 320 to decrementally count the correlation counters.

When the Synchronizing Commutator 288 reaches a predetermined stage in its counting sequence, a control signal is provided on wire 360 as an input to the Timing Pulse Control 258. This pulse indicates that the input message has been received and that the allowable time for decoding has elapsed, thereby allowing the circuitry to be initialized to receive the next message. The Timing Pulse Control 258 thereupon issues the T7 control pulse on wire 362 whereby all of the P Registers, are cleared in anticipation of receiving the next message input. Having completed the decoding and adaptation cycle, the circuitry is ready to be further synchronized and initialized as described above, and the next input signal grouping received.

In addition to he circuitry described, the self-adaptive decoder is provided with a Real-Time Oscillator 364. The clock is contained in a special register and can be referenced or set by manual external means, or by counting up caused by the oscillator. The clock is incremented automatically by the issuance by the signal of a 1/1024 c.p.s. crystal oscillator 364 on wire 366. Time is maintained accurate to the nearest $2^{-10}$ second. In addition to the Real-Time Clock register, the Real-Time Control Circuitry 368 has a manually settable register which may be utilized to set a predetermined Real-Time interval. The Real-Time control 368 operates to compare the value calculated by the Real-Time Clock and the value set in to the associated register, and when finding comparison issues a pulse on wire 370 whereby all of the change history counters 336, 352 are cleared. This operation provides a means for selectively controlling the updating of the nominal codes depending upon the probability of the relationship of errors in transmission and the rate at which intentional permutations are made. It will be recalled that it is only desirable to alter any digit of any nominal code upon determining that such a change has been made at the sending station. It is not desirable to maintain a change history for a long period of time such that noise perturbations may be allowed to accumulate to a point which would indicate to the history circuitry that it is time to alter the associated nominal code when in fact no permutation has been made. To alleviate this problem, the Real-Time Control 368 is provided so that after the predetermined elapsed time, the change histories may be set to zero thereby negating the accumulated effect of noise on the adaptive system.

The above general description of the self-adaptive decoder and the timing thereof will be described in more detail in the following paragraphs.

*Correlation counter*

The counter which is utilized for each message type to calculate the correlation value is illustrated in FIG. 19. This counter will be considered separately, and will be illustrated in logic diagram form in the consideration of the detailed circuitry of the self-adaptive decoder.

The counter consists of a Count Register shown enclosed in dashed block 390, and the associated array of thin films and drivers which operate to perform the counting function in parallel. For purposes of illustration, the count register 390 is shown as consisting of four individual stages labeled T–FF0 through T–FF3. Limitation to operation as a four stage counter is illustrative only since the counter can be expanded by adding more Toggle Flip-Flops to the count register 390 and by adding the required number of thin film elements with the associated drivers to perform the counting function. Since the Count Register 390 consists of four stages, each of which is capable of assuming two defined states or levels of potential, the modulus of the register is $2^4-1$.

The thin film elements associated with the Count Register 390 are substantially identical and are labeled 392 through 410. These thin films consist of ferromagnetic material with uniaxial anisotropy, i.e., films having a single easy or preferred orientation of the axis of magnetization and transverse thereto a single difficult magnetization axis, both axes being in the plane of the film. Such films are most easily prepared by vacuum depoistion of nickel-iron binary alloy having, for example, approximately 82 percent nickel, remainder iron, in the presence of a strong orienting field applied in the plane of the film as described in the Rubens Patent Number 2,900,282. These films are deposited to a Substrate (not shown) according to the aforementioned Rubens patent.

Connected to the arbitrarily defined "1" terminals of the stages of the Count Register 390 are state-indicating conductors 412 through 418, each of which magnetically couples a group of films in the array. These conductors are represented as lined in the schematic drawings whereas in the actual circuit they are current sheets which may be prepared by using printed circuit etching techniques such as explained in the above mentioned Rubens patent. These state-indicating conductors 412–418 are oriented such that they run in a direction substantially parallel to the preferred or easy axis of the film groups associated therewith. Taking film element 410 as illustrative, the easy axis is oriented as illustrated by arrow 420. Hence, when a particular stage, say stage T–FF0 of count register 390, is in the "1" state a current flows through its associated conductor 412 from ground terminal 422 and establishes a magnetic field in the proximity of the films 392 through 398 which (as can be verified by using the right hand rule) acts in a direction substantially transverse to the easy axis of these films. In the vector diagrams of FIG. 20a and FIG. 20b, the easy axis of each film is indicated by dashed line 424, and the field $H_S$ produced by current flowing though conductors 412 through 418 is indicated by vector 426. This follows from the fact that a zero voltage indicated a logical "0" and a logical "1" is represented by a negative voltage as described above, thereby causing conventional current to flow from ground terminal 422 for this example, upward in conductor 412. FIG. 20a is a vector representation of an increasing counter, and FIG. 20b is that of a decreasing counter.

In order to function as an increasing counter, that is a counter which when pulsed assumes a count larger in magnitude than the count originally contained in the Count Register 390, the film array is initially biased such that when no field $H_S$ is applied via conductors 412 through 418, the magnetization of all the films in the array is at some angle A with respect to their easy axes thereby placing all the films in an arbitrarily defined "0" state shown vector 428 in FIG. 20a. The means for providing this initial state bias consists of a current generator which supplies current to the array of the film elements via conductors 430 through 436, where said conducting sheets are aligned parallel to the easy axis of the films. These bias conductors are terminated at a ground connection 438 such that when the bias supply is coupled to a negative constant current generator, conventional current flows downward in bias conductors 430–436 and produces a field in the respective film elements which is illustrated in FIG. 20a by vector $H_B$ labeled 440, and causes the magnetization vector to be partially rotated at an angle A from the preferred axis to align in the arbitrarily defined zero position designated 428. This bias condition is constantly applied and is necessary for the operation of the counter. It will be noted, that the bias vector $H_B$ represents a field which is equal and opposite to the field provided by the "1" signals that may be applied on state-indicating conductors 412 through 418. Thus, when a number is entered into the Count Register 390, certain films in the array will have their magnetization vector rotated back into alignment with their easy axis, thereby placing them in an arbitrarily defined "1" state as indicated by vector 442 by the action of the state-indicating field $T_S$, the latter field being established when a "1" is contained in a particular Count Register stage. This results in the situation where the film elements in the group corresponding to the particular stage of the Count Register 390 are all either biased to have their magnetization vectors displaced from the easy axis if the stage stores a "0", or they have their magnetization vectors aligned with the easy axis if the stage stores a "1".

When the film array is provided with its pre-biased condition and with the value of the Count Register having realigned the magnetization vector of the groups of films which corresponds to the stages storing a "1" with the respective to their easy axes, an advance count pulse can be applied on conductor 444. This pulse is applied to the pulse driver 446 which is coupled at the output to conductors 448, 450, 452, and 454. The count pulse is a negative pulse and the pulse out of the pulse driver 446 is likewise a negative going pulse, thereby causing conventional current to flow in conductors 448-454 from ground terminal 438 to the left on the drawing. This current causes a drive field $H_D$ indicated by vector 456 in FIG. 20a and FIG. 20b to be applied to all of the film elements in the array. This field causes the magnetization of those films that are in the "0" state to be further rotated away from the easy axis and thereby induces an output signal on the suitably arranged sense lines 458, 460, 462, and 464 which are inductively coupled thereto. No significant signal will be induced in those sense lines linking films whose magnetization has been rotated back into alignment with their easy axis, i.e., that are in the "1" state, since in this case the drive field $H_D$ is parallel to the position of the magnetization vectors and incapable of producing a further rotation. In this embodiment, the drive field $H_D$ is applied parallel to the preferred film axes, and it will be noted that this field is of a predetermined strength which is insufficient to cause the films existing in states represented by vectors 424 and 428 to switch states, that is, reverse direction of the magnetization vector by 180 degrees. The sense lines 468-464 are respectively coupled at one end to inverter driver circuits 466 through 472. As a result, when a substantial signal appears on a particular sense line, no signal results at the output of the associated inverter. Conversely, if no signal is induced in a particular sense line, a substantial signal is produced at the output of its associated inverter. The outputs from the inverter stages, except the highest ordered stage 472 are applied as inputs to the Count Register 390. Inverter I1 has its output signal applied on conductor 474 as one of the inputs to AND circuit 476; Inverter I2 has its output pulse coupled by wire 478 to AND circuit 480; and, finally, Inverter I3 has its output pulse applied on conductor 482 as an input to AND circuit 484. The output from Inverter I4 on conductor 486 may be utilized to indicate when the Count Register 390 has exceeded its modulus and will overflow. It will be noted, that pulse driver 466 in addition to providing the drive field $H_D$, provides a pulse on conductor 488 which is coupled to delay element 490. This delay element is such that a pulse applied at its input will not be available at the output 492 until such time as the advance count pulse on wire 444 has reutrned to zero volts. At this time, the array of films have been sensed and the pulses indicating the states of the respective registers are being propagated over wires 474, 478, and 482 such that when the delayed pulse appears at output 492, and is applied on enable line 494 to the respective AND Circuits 476, 480, and 484 the results will be gated through and the Toggle Flip-Flops which comprise the Count Register 390 will be altered accordingly where "1" signals are applied at the input terminal. The delayed pulse is applied directly to T-FF0 to cause it to toggle each time an advance pulse is provided.

The operation as a decreasing counter proceeds in a similar fashion except that no initial bias is applied on conductors 430-436. The results in the magnetization vectors of film elements associated with stages which store a "1" being caused to be rotated as an angle B as shown in FIG. 20b due to the field $H_S$. The vector position representing a "1" state is labeled 496, and the vector aligned with the preferred axis which represents the "0" state for the respective films is labeled 500. As was described above, the occurrence of an advanced pulse on wire 444 causes a negative pulse to be issued to conductors 448-454 such that those film elements which are associated with a stage storing a "0" are substantially unaltered while those elements associated with a stage storing a "1" have their respective magnetization vectors rotated further from the preferred axis. The field $H_D$ provided for the decreasing count is applied identically with that of the increasing count. The operation of the circuit is exactly as was described above from this point on.

To initially set up the Count Register 390, it is necessary to apply the T1 control pulse on wire 268 to the clear inputs of each stage of the register. Following this operation, if it is desired to set a predetermined weight value in the Count Register 390, input signals are applied at terminals 502, 504, 506, and 508 to precondition the respective stages of the count register to the desired value.

The output from the "0," or complement, side of the Toggle Flip-Flops which comprise the Count Register 390 are applied on wires 510, 512, 514, and 516 to the associated message selector. The operation of the message selector will be described in more detail below. It will be noted, that this connection results in a "1" signal being present on conductors 510 through 516 when each stage of the Count Register 390 stores a "0."

Synchronizing commutator

Figure 21:
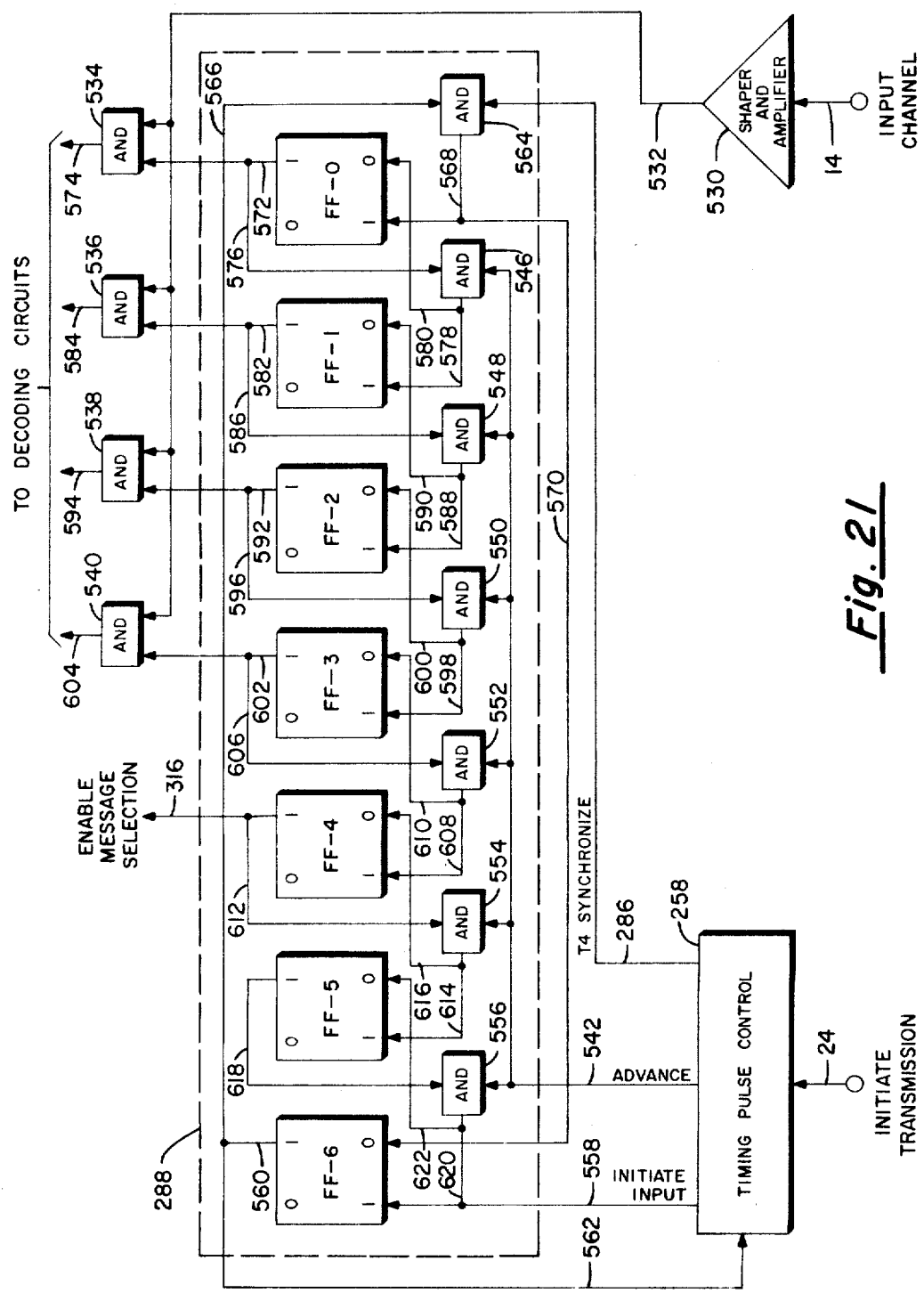
FIG. 21 is a logic diagram of the synchronizing commutator utilized to control the sequence of application of received message signals to the appropriate decoding circuits.

The Synchronizing Commutator, illustrated in logic Diagram Form in FIG. 21 is enclosed in dashed box 288, and is utilized to provide a synchronization of the serially applied input signals on input channel 14 to distribute the respective digit signals to their associated decoding circuitry. The signals which make up the input message are applied serially on input channel 14 to Shaper and Amplifier circuit 530. This circuit is of a type well known in the art and is utilized to correct any signal deterioration that may have occurred during transmission, so that the signals applied on conductor 532 are within the tolerances required for the operation of the digital circuitry. These input signals are applied simultaneously to each of AND circuits 534, 536, 538, and 540. It will be noted that for illustrative purposes again only four binary digit positions will be described. In the event that it is desired to utilize this invention for message signal groupings in excess of four digits, it is necessary to add for each digit position another stage to the Synchronizing Commutator 288 and the circuitry, to be described in more detail below, which is utilized to decode each digit position.

The Synchronizing Commutator 288 is essentially a ring counter and is comprised of a plurality of flip-flops FF-0 through FF-6. It operates to advance the storage of a "1" from stage to stage each time an advance pulse is provided on conductor 542 from the Timing Pulse Control 258. The advance pulse provided on wire 542 is applied to gates 546, 548, 550, 552, 554, and 556. The operation is such that when the Timing Pulse Control 258 receives an Initiate Transmission signal on wire 24, the Timing Pulse Control 258 issues a pulse on the Initiate Input conductor 558 which operates to set FF-6 to the "1" state. Having been set to the "1" state, FF-6 provides an output pulse on conductor 560 which is directed to the Timing Pulse Control 258 over wire 562, and to the synchronizing AND circuit 564 over conductor 566. The Timing Pulse Control 258 in response to the "1" signal received on conductor 562 issues the T4 synchronize control pulse on conductor 286 which is applied to synchronizing AND circuit 564. Since both of the input terminals to enabling AND circuit 564 are thereby maintained at the "1" level, a "1" is provided on conductor 568 and applied as an input to the Set terminal of FF-0. The output from AND circuit 564 is also applied on conductor 570 as an input to the Clear side of FF-6, thereby returning it to the "0" condition and clearing the pulse at output terminal 560 to "0." This disables the input pulse applied on conductor 562 to the Timing Pulse Control 258, and disables the pulse applied on conductor 566 to the synchronizing AND circuit 564. The timing is such, that the interval of time between the reception of the Initiate Transmission signal on conductor 24 and the completion of the synchronization operation is such that upon completion of synchronization the lowest ordered digit of the input message is available on input chanel 14. It can be seen, then, that the occurrence of setting a "1" in FF-0, due to the occurrence of the advance pulse, operates to provide a "1" signal on conductor 572 as an input to AND circuit 534. This simultaneous occurrence of the lowest ordered digit input signal on conductor 532 and the "1" signal applied on conductor 572 to AND circuit 534 provides the enabling condition such that the lowest ordered digit is passed on conductor 574 as an input to the decoding circuits for all of the message types for that digit position. Likewise, the other AND circuits 536, 538, and 540 are disabled due to the storage of a "0" respectively in circuits FF–1, FF–2, and FF–3, thereby disabling the lowest ordered digit signal occurring on conductor 532 from passing through these AND circuits. The output from FF–1 is applied also on conductor 576 as an enable input to AND circuit 546, such that the occurrence of an advance pulse on conductor 542 operates to activate AND circuit 546 to provide an output on conductor 578. This output operates to set FF–1 to its "1" condition, and is applied on conductor 580 to clear FF–0. By clearing FF–0, a "0" is available on conductor 572 thereby disabling AND circuit 534. By providing the set signal to FF–1, a "1" signal is applied at conductor 582 to enable AND circuit 536 so that the second lowest ordered digit of the input message, as applied on conductor 532, will be passed as an output signal on conductor 584 to its associated decoding circuitry. The output from FF–1 is applied also to enable AND circuit 548 via conductor 586, so that the occurrence of the next advance pulse on conductor 542 operates to pass a "1" through the gate to provide it as a Set signal on conductor 588, whereby FF–2 is Set to the "1" condition. It is also applied on conductor 590 to clear FF–1. As was described above, having cleared FF–1, the output on conductor 582 becomes a "0" and AND circuit 536 is disabled. Having been Set, FF–2 provides a "1" signal on conductor 592 whereby AND circuit 538 is enabled so that the third from the lowest ordered digit of the input message is gated through and provided as a signal on conductor 594 to be applied to its associated decoding circuitry. Additionally, the output from FF–2 is provided on conductor 596 as an enable to AND circuit 550, whereby the occurrence of the next advanced pulse on conductor 542 operates to provide a "1" as an input signal on conductor 598 to FF–3. This signal is also applied on conductor 600 to the Clear side of FF–2, which operates to disable AND circuit 538. Setting FF–3 provides a "1" signal on conductor 602 whereby AND circuit 540 is enabled so that the occurrence of the highest ordered digit of the message input on conductor 432 will allow it to be passed through gate 540 on conductor 604 to its associated decoding circuits. Additionally, a "1" signal is provided on conductor 606 as an input enable to AND circuit 552 whereby the occurrence of the next advance pulse on conductor 542 provides a 1 on conductor 608 to Set FF–4. A further signal is provided from AND circuit 552 on conductor 610 to the Clear side of FF–3 whereby the AND circuit 540 is disabled. At this time it will be seen that each of the digit signals of the input message is commutated in order by setting in order each of the flip-flops FF–0 through FF–3, whereby only one of the AND circuits to the decoding is enabled at a time, and is enabled in such a manner that the digit of the input message which corresponds to the decoding circuitry is processed in order.

Having Set FF–4, a "1" is present on conductor 316 to enable the message selection operation by enabling the Timing Pulse Control 258, and OR conductor 612 which enables AND circuit 554, so that the occurrence of the next advance pulse provides a "1" signal on conductor 614 to Set FF–5. This signal is also applied on conductor 616 to the Clear side of FF–4. It will be noted that no output is taken from FF–4 nor FF–5, to enable any decoding circuitry, and this provides a period in which the transmitting station may transmit random signals on input channel 14 which will not be decoded, while still allowing time for the decoding circuitry to select the proper message. Having Set FF–5, a "1" signal is available on conductor 618 to enable AND circuit 556 so that the occurrence of the next advance pulse provides a "1" signal on conductor 620, which is applied on conductor 620 to Set FF–6. It is also applied on conductor 622 to the Clear side of FF–5 to clear that stage. Having reset FF–6 to the "1" condition, the commutator is in a position to repeat the cycle just described for the next message, and the circuitry will operate to provide the newly set "1" in FF–6 as a signal on conductor 562 to the Timing Pulse Control circuitry 258, which will in turn operate to enable the issuance of the control signal T4 to synchronize the operation by a pulse on conductor 286.

In summary, then, it will be noted that the commutator starts from the lowest ordered stage FF–0 and enables the digits of the input message in order through the AND circuits which are provided to drive all of the decoding circuits. A further feature is provided in the stages of the commutator FF–4, FF–5, and FF–6 which operate to allow random inputs on input channel 14 to be provided without allowing such random signals to be applied to the decoding circuitry, and thereby provides a higher degree of secrecy than would be present if start-mark and stop-mark pulses were to be provided to designate the message length. The operation of the decoding circuits will be described in detail in the following paragraphs.

For purposes of illustration, assume that an example message A having the code 1010 is to be received on input channel 14. It can be seen that having synchronized the Commutator 288, the occurrence of the first advance pulse on conductor 542 will gate the lowest ordered digit of the input message, namely a "0," through AND circuit 534 on conductor 574 to the decoding circuits. It can be seen that the remainder of the stages of the Synchronizing Commutator 288 (FF–1 through FF–6) each store a "0" thereby disabling the remainder of the gating AND circuits 536, 538, and 540. Having completed the transfer of the lowest ordered digit, the second advance pulse operates to set FF–1, thereby gating the second lowest ordered digit of the input signal, namely a "1", through AND circuit 536 on conductor 584 to the decoding circuits. The occurrence of the third advance pulse on conductor 542 operates to enable and set FF–2 thereby enabling AND circuit 538 to provide the third digit, a "0" of the input message on conductor 594 to the decoding circuits. Finally, the fourth advance pulse operates to Set FF–3 and Clear the remainder of the stages such that AND circuit 540 is enabled to pass the fourth digit, a "1", of the input message conductor 604 to the decoding circuitry. These signal values will be carried through the decoding circuitry described below to illustrate that operation.

*Permutation counter*

As was described above, it is a part of the adaptive function of the decoder to maintain a history for each digit position of selected messages which indicates the number of times each of said digit positions has been detected to be different from the stored nominal code. To accomplish this function or providing a history, a counter is provided for each digit position of each message so that upon the determination that (1) the associated message is selected; and (2) that the digit position of the received signal is different from that of the stored nominal code, the count of the corresponding counter is advanced.

Figure 22:
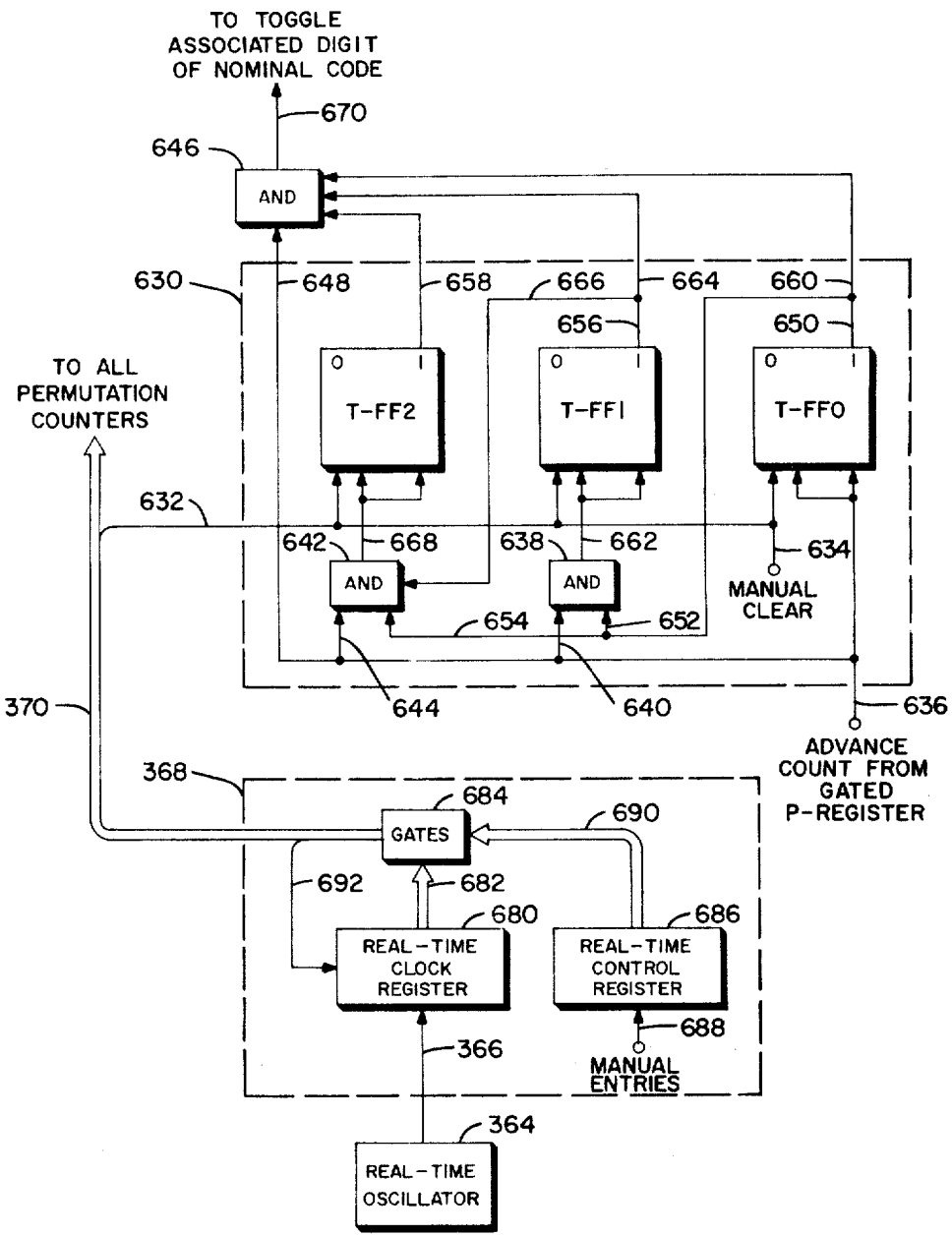
FIG. 22 is a logic diagram of an exemplary permutation counter as controlled by the real-time control for this embodiment of the self-adaptive decoder.

FIG. 22 is an illustration of the Permutation Counter, enclosed in dashed box 630, in association with the Real-Time Control shown enclosed in dashed block 368. For illustrative purposes the Permutation Counter is comprised of three Toggle Flip-Flops, namely T–FF0, T–FF1, and T–FF2. These Toggle Flip-lops are provided collectively with a Clear input from conductor 632, which is also coupled to the manual clear 634. The Clear cable 370, is directed from the Real-Time Control 368 to all of the Permutation Counters. At the outset, Permutation Counter 630 is presumed to be in the cleared condition. Thereafter upon receipt of an advance count pulse on conductor 636 from the associated stage of the selected P Register, T–F0 is Set to the "1" condition. It will be noted that the advance pulse is simultaneously applied to AND circuit 638 via conductor 640, AND circuit 642 via conductor 644, and AND circuit 646 via conductor 648. Having set T–FF0, a "1" signal is provided at output terminal 650, which is transmitted over conductor 652 as an enable to AND circuit 638, and over conductor 654 as an enable to AND circuit 642. It will be seen that at this time both T–FF1 and T–FF2 are providing "0's" from their respective output terminals 656, 658. The output from T–FF0 is additionally provided via conductor 660 as one of the input signals to AND circuit 646. Having Set T–FF0 to "1", and thereby enabling AND circuit 638, the occurrence of the next advance count pulse on conductor 636 will result in a Toggle input being passed through AND circuit 638 to T–FF1 via conductor 662. At the same time, the second advance pulse operates to Toggle T–FF0 such that a "0" is stored therein. At this time, the Permutation Counter stores the combination 010 which is binary 2 and represents the count of the number of detected permutations. The output from T–FF1 is applied as an input to AND circuit 646 on conductor 664, and provides an additional input to AND circuit 642 on conductor 666. At this time it will be noted that a "1" signal is present on conductor 666, but that a "0" signal is being carried on conductor 654 thereby disabling AND circuit 642. It will be further noted that having Toggled T–FF0 to the "0" state, a "0" is presently being fed via conductor 652 to AND circuit 638 thereby disabling it. This results in the situation wherein the occurrence of the third advance count pulse received from the P Register on conductor 636 results in the resetting of T–FF0 to the "1" condition without affecting the condition of either T–FF1 or T–FF2. The condition following the occurence of the third advance pulse is that T–FF0 and T–FF1 both store 1's and the binary count is now 011, which is binary 3. At this juncture, AND circuit 638 is enabled with a "1" on conductor 652, and AND circuit 642 is fully enabled with "1's" on conductor 666 and on conductor 654. This yields a condition wherein the receipt of the fourth advance pulse on conductor 636 operates to set T–FF2 to the "1" condition by passing a pulse through AND circuit 642 on conductor 668. Further, T–FF1 is switched to the "0" state by passing the advance pulse through AND circuit 638 and providing it as an input on conductor 662. Finally, T–FF0 is Set to the "0" state by the direct input of the advance pulse. Now it can be seen that the stages of the Permutation Counter contain respectively 100 and yields the count of the number of the received advance pulses. Having toggled T–FF1 and T–FF0 to the "0" condition, AND circuits 642 and 638 are now completely disabled and the occurrence of the fifth advance pulse will operate only to set T–FF0. This opertion continues as described until such time as seven advance pulses have been received and have thereby set each stage to store a "1", which operates to put "1" signals on AND circuit 646 on conductors 660, 664, and 658. The occurrence of the eighth advance count pulse on conductor 636 operates to finally enable AND circuit 646 by providing the remaining needed input on conductor 648 such that a "1" signal is provided as an output to correct the associated digit of the nominal code on conductor 670. The eighth advance pulse also operates to clear all of the stages of the Permutation Counter thereby readying it to compile a history for the same digit position for a further count of seven. It will be noted, that the count of seven being required before an associated digit position will be toggled is arbitrary and should it be desired to require more detected changes before correcting, it would only be necessary to add more stages. Likewise should fewer detected permutations be desired before correcting, fewer stages than those illustrated may be used.

It will be recalled that the description above indicated that the self-adaptive system is operative to select a message based on a received combination of input signals which is the closest correspondence to one of the stored nominal codes. It will be further recalled that the cause of detected differences between digit positions could arise from an intentional permutation at the transmitting station, or the injection of a noise signal during transmission. Of course it is undesirable to toggle a digit of the nominal code based on an accumulation of detected noise errors for the selected message. To alleviate this problem, a feature has been provided in the self-adaptive decoder whereby a period of elasped time is calculated, and if a change is not required within this period of time the permutation counters are all reset to zero and the history restarted. To accomplish this the Real-Time Control 368, described above, is utilized. This Real-Time Control consists of the Real-Time Clock Register 680 which is responsive to the Real-Time Oscillator 364 via advance pulses received on conductor 366, and has an accuracy as was described above. The Clock register 680 provides a means of maintaining Real-Time of incremental accuracy, and provides outputs on cable 682 from each of its stages, which are applied individually to associated gates 684. Additionally, the Real-Time Control 368 includes a Real-Time Control Register 686 which is comprised of bistable flip-flops. The Control Register 686 is responsive to manual entries 688 such that a predetermined period of time may be manually entered therein. This is illustrative only and by proper adjustment and control, the Control Register 686 may be electronically set. Each stage of the Real-Time Control Register 686 is associated with a conductor which comprises cable 690 and is applied to the corresponding ones of the gates 684 such that each digit position of the Real-Time Clock Register 680 is compared to the Real-Time Control Register 686 stage and upon complete comparison, a clear signal is issued on conductor 370 which clears all of the permutation counters. Additionally, the occurrence of a clear pulse on conductors 370 is also applied as a clear pulse on conductor 692 to reset the Real-Time Clock Register 680 back to zero, thereby permitting a recycling of the control operation. From this it can be seen that by appropriate adjustment of the entry in the Real-Time Register 686, that the time that will elapse is controlled, and may be varied according to the condition of the transmission channel and the externally determined probability of noise being injected. This control provides a feature of adjustability which allows the operator to select a greater or lesser amount of time which must elapse between clearing of the histories of detected permutations such that the effect of noise in transmission may be made as minimal as possible in the adaptive process.

*Decoding and adaptation circuitry*

Figure 23A:
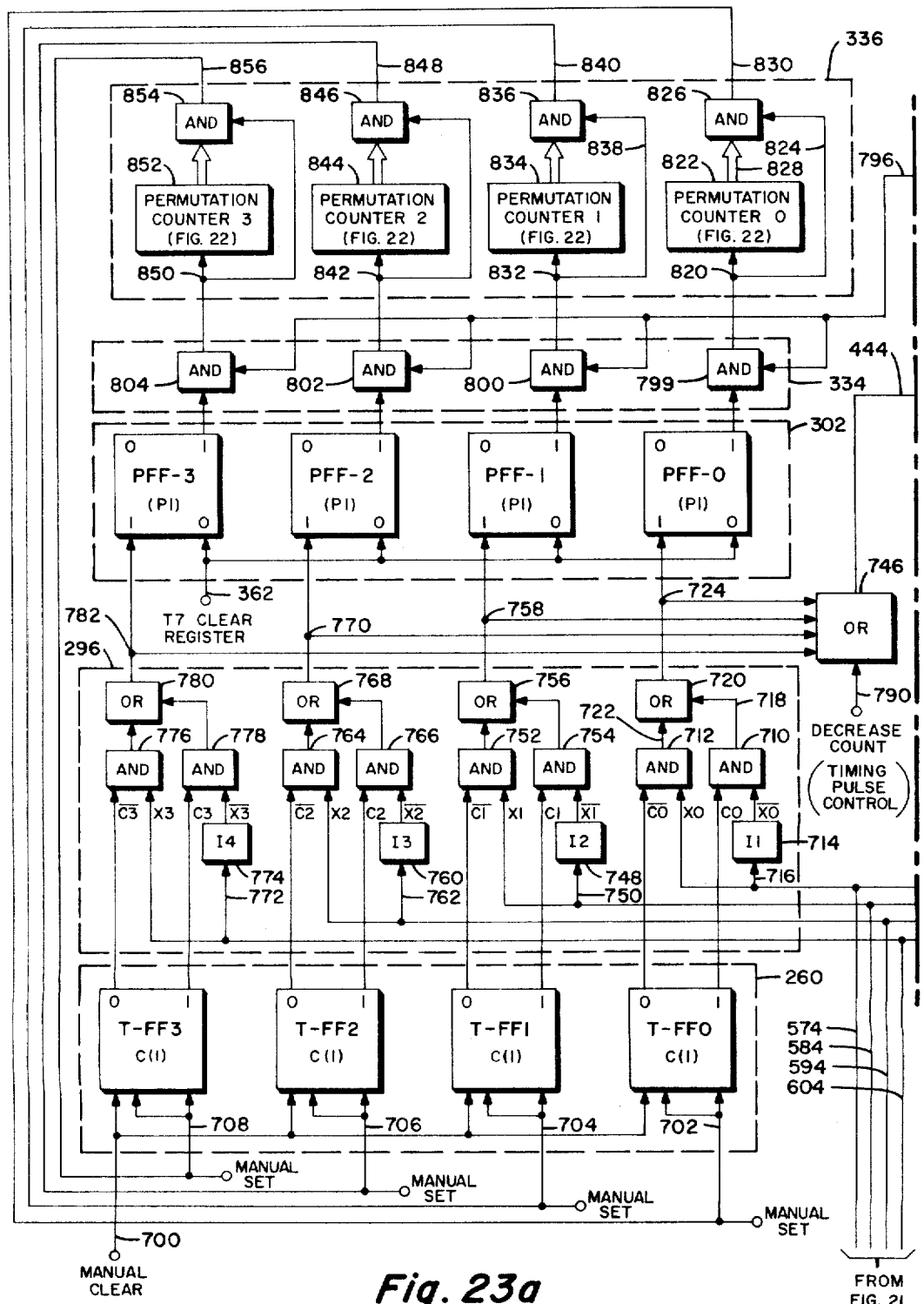
FIG. 23a and FIG. 23b is the logic circuitry which decodes the received message signals and provides the self-adaptive feature of this invention.
Figure 23B:
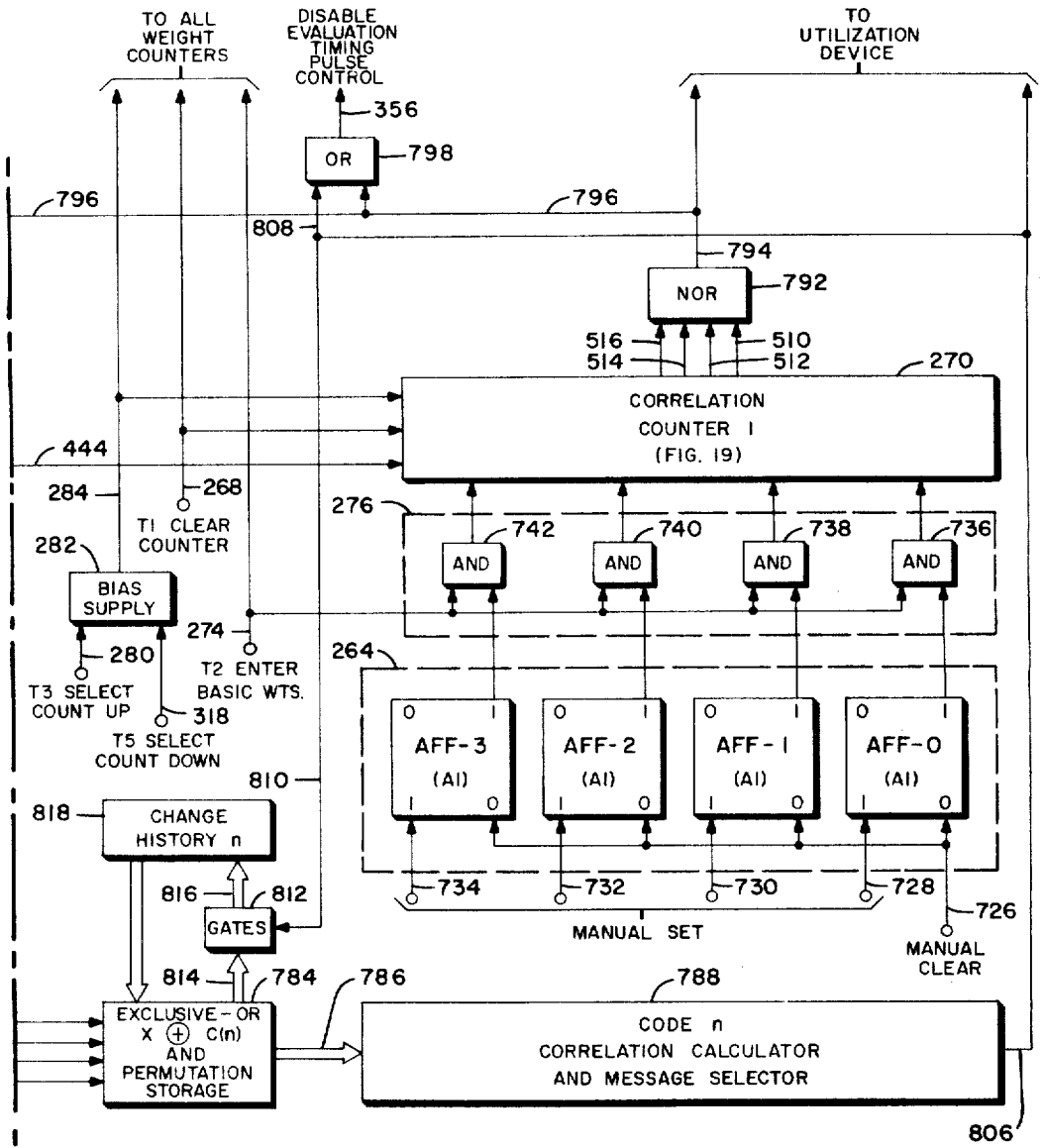
Figure 24:
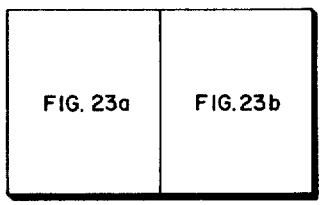
FIG. 24 is a plan arrangement which illustrates how FIG. 23a and FIG. 23b should be oriented for consideration together.

FIG. 24 shows the relationship of the two sheets of drawings for FIG. 23a and FIG. 23b, which illustrate the logic circuitry required to decode one message having four binary digits, and that logic circuitry necessary to provide the history and self-adaptation for the stored nominal code. A consideration will be given for the decoding circuitry for nominal code $C(l)$, and in block form for nominal code $C(n)$.

The register which is initially set to store nominal code $C(l)$ is shown enclosed in dashed block 260 (see also FIG. 18) and is comprised of four Toggle Flip-Flops, T–FF0 through T–FF3. A means for manually clearing the $C(l)$ storage register 260 is provided by conductor 700 which is coupled in common to the Clear input of each of the Toggle Flip-Flops which comprise the register. Having cleared the nominal code storing register 260, manual set inputs are provided for each stage 702, 704, 706, and 708. This provides a means whereby the initial parameter of the nominal $C(l)$ may be entered. A similar register is required for each of the message types which are predetermined to comprise the class of messages which may be decoded. The size of the register 260 is shown as being four binary digits, but this is illustrative only in that the size of the storage register required for the nominal codes will be adapted according to the number of digits which comprise the overall message size. Expansion of the number of stages from those illustrated herein is obvious.

The logical circuitry which forms the function $X \oplus C(1)$ is shown enclosed in dashed block 296 (see also FIG. 18). The formation of the logical sum, or Exclusive-OR, of each digit in the input message with the corresponding digit of the stored nominal code C(1) follows the relationship set forth below:

$$P = \overline{C}X + C\overline{X}$$

where P represents a permutated digit.

This general expression can be applied to each stage of the Exclusive-OR circuitry as follows:

$$P(1)0 = \overline{C0}X0 + C0\overline{X0}$$
$$P(1)1 = \overline{C1}X1 + C1\overline{X1}$$
$$P(1)2 = \overline{C2}X2 + C2\overline{X2}$$
$$P(1)3 = \overline{C3}X3 + C3\overline{X3}$$
$$\cdot \quad \cdot \quad \cdot \quad \cdot \quad \cdot$$
$$P(1)j = \overline{Cj}Xj + Cj\overline{Xj}$$

where
P is the permutated digit;
(1) designates message type 1;
0–j designate the digit position being considered;
C0 through Cj indicate the digit value of the respective digits of the nominal C(1) code; and
X0 through Xj indicate the respective digit values of the received input message.

Following the example set forth above where the alphabetic letter "A" is represented by the digital configuration 1010. The Respective stages of the storage register 260 for the nominal code of C(1) would find T–FF0 storing a "0," T–FF1 storing a "1," T–FF2 storing a "0," and T–FF3 storing a "1." The storage of a "0" by T–FF0 provides a "0" pulse to AND circuit 710 on conductor C0, and a '1" signal to AND circuit 712 on conductor $\overline{C0}$. When the Synchronizing Commutator 288, described in FIG. 21, gates the lowest ordered digit on to conductor 574, a "0" signal is presented to inverter I1 labeled 14 via conductor 716, thereby providing on conductor $\overline{X0}$ a "1" signal to AND circuit 710. The occurrence of a "0" and a "1" input combination to AND circuit 710 results in a "0" on conductor 718 being provided as an input to OR circuit 720. The lowest ordered digit is also applied via conductor X0 to AND circuit 712. The occurrence of a "0" and a "1" signal combination to AND circuit 712 results in an output on conductor 722 which is a "0," and being applied to OR circuit 720, results in a "0" being applied on conductor 724. This indicates the exact correspondence between the received signal and the signal stored in the nominal code register 260.

It will be recalled, as was described above, that initialization of the self-adaptive decoder is performed by the Timing Pulse Control 258 circuitry whereby the T1 control pulse was issued on conductor 268 to clear all of the Correlation Counters. It will also be recalled that a set of initial parameters are required to be entered in the A Registers which consist of the weight values for the respective message types. For message type 1, a weight value calculated according to the above set forth equation is entered into the A1 Register, shown enclosed in dashed block 264. This register consists of a plurality of bistable flip-flops AFF–0 through AFF–3, which are provided with a manual clear via conductor 726 and a set of manual-set inputs 728, 730, 732, and 734. Having preset the weight values in the respective A registers, the occurrence of the T2 control pulse on conductor 274 operates to enable the gates, shown enclosed in dashed block 276. These gates consist of AND circuits 736, 736, 740, and 742 and are operative, when enabled, to pass the respective digits of the weight factor into the Correlation Counter 270 (see also FIG. 19). Having set each of the Correlation Counters with the respective initial weight values, Timing Pulse Control 258 operates to issue the T3 control pulse on conductor 280 thereby selecting from the bias supply 282 a value of bias which will be applied on conductor 284 to each of the Correlation Counters which will cause the Correlation Counters to increase by one upon the occurrence of a count pulse on conductor 444.

The Permutation Registers of which, for illustrative purposes, the P1 Register is shown enclosed in dashed block 302, are each comprised of a set of bistable flip-flops PFF–0 through PFF–3.

The result of the zero stage Exclusive-OR operation is applied via conductor 724 to PFF–0, and will cause this stage to be left in the "0" condition due to the correspondence between the received digit signal and the signal of the C(1) nominal code. This same signal is also applied to OR circuit 746 which is coupled to Correlation Counter 1 labeled 270. Since a "0" is applied on conductor 724, there is no advance pulse issued from OR circuit 746 via conductor 444, and the Correlation Counter 270 remains in its initial condition.

Next turning to the second lowest ordered digit ("1") received on conductor 584, it will be seen to be applied to inverter I2 labeled 748 via conductor 750, and to AND circuit 752 via conductor X1. Since T–FF1 stores a "1" for this example, the output therefrom to AND circuit 752 on conductor $\overline{C1}$ is a "0" and the output to AND circuit 754 on conductor C1 is a "1." Recalling that X1 was received as a "1" signal, neither AND circuit 752 nor AND circuit 754 will provide a "1" output to OR circuit 756, which means that the signal appearing on conductor 758 will be a "0." This will cause PFF–1 to remain in the cleared state and will cause OR circuit 746 to continue to pass a "0" signal on conductor 444, thereby leaving Correlation Counter 1 in its initial condition.

Next considering the third digit received on conductor 594 ("0") from the Synchronizing Commutator illustrated in FIG. 21, it will be seen that inverter I3 labeled 760 receives a "0" signal via conductor 762 and AND circuit 764 receives a "0" signal via conductor X2. The "0" signal received by I3 is transferred after negation to AND circuit 766 as a "1" signal on conductor $\overline{X2}$. Simultaneously, T–FF2 is providing a "0" on conductor C2 to AND circuit 766, and is providing a "1" signal on conductor $\overline{C2}$ to AND circuit 764. Again it can be seen that the occurrence of the 0–1 combination on both AND circuits 764 and 766 results in OR circuit 768 providing a "0" signal on conductor 770. This signal operates to leave PFF–2 in its cleared state, and OR circuit 746 to provide a zero signal on conductor 444, thereby leaving the Correlation Counter 270 in its initial condition.

Finally, considering the signal received on conductor 604, it will be applied via conductor 772 to inverter I4 labeled 774, and to AND circuit 776 via conductor X3. The "1" signal received by I4 is provided after inversion to AND circuit 778 via conductor $\overline{X3}$. Since T–FF3 stores, a "1" it provides a "1" signal on conductor C3 to AND circuit 778, and provides a "0" signal on conductor $\overline{C3}$ to AND circuit 776. From this it can be seen that OR circuit 780 provides a "0" signal on conductor 782 thereby causing TFF–3 to remain in the cleared state. Further, it provides a "0" to OR circuit 746, which again leaves the Correlation Counter 270 unaltered. From the foregoing discussion it can be seen that there having been exact correlation between a received signal grouping which represents a message and the stored nominal code C(*l*), that the Correlation Counter 1 has been unaltered, and remains at the initial weight value.

For purposes of further explanation, assume that during transmission the lowest ordered digit in the message X has been perturbed such that the signal received on conductor 574 is read in as a "1" signal while the value stored in T-FF0 is a "0" signal. Following this through, it will be seen that inverter I1 provides the inverted value of the input signal, namely a "0," on conductor X0 to AND circuit 710. Simultaneously therewith, T-FF0 is providing a "0" on conductor C0 to AND circuit 710. The coincidence of "0's" results in an output of "0" on conductor 718, and does not operate to provide an output from OR circuit 720. However, the "1" signal being applied on conductor X0 to AND circuit 712, along with the simultaneous occurrence of the "1" signal on conductor C0 results in a "1" being presented to OR circuit 720 via conductor 722. This results in a "1" signal being presented on conductor 724 to the Set side of PFF-0, thereby setting it to the "1" state. Further, a one on conductor 724 results in OR circuit 746 providing a "1" on conductor 444, thereby entering an advance pulse to Correlation Counter 1 and increasing its value by one. For the instance when a "1" is stored in a stage of the nominal code storage register 260, and its corresponding input is toggled, the other half of the Exclusive-OR circuitry, namely the Inverter-AND circuit combination, operates to provide the "1" signal which sets the P Register and advances the counter.

The commutated inputs received from the Synchronizing Commutator 288 are applied in parallel to all of the message decoders. Since the operation of each of the decoders is identical, only one detailed embodiment is shown and the decoder for the *n*th message is illustrated in block diagram form. The formation of the Exclusive-OR's and the storage of the detected permutations are illustrated by block 784. The outputs from this circuitry are provided on cable 786 to code *n* correlation calculator and message selector 788.

It should be pointed out at this time that for this embodiment where the signals are received serially, the described apparatus operates in a serial fashion due to the control of the Synchronizing Commutator 288. The invention is not limited to this serial operation; however, in that in the event a communication channel is established which transmits the message signal in parallel, the Exclusive-OR circuitry can be gated in parallel since each of the nominal codes are provided in parallel. This would result in the respective P Registers being set in parallel, and would require the change that the Correlation Counter instead of counting in a serial fashion would be provided with an adder. An intermediate step would be required whereby the number of permutations detected for each message would be determined in advance of applying this count to the correlation count adder. From that point on, the operation of the decoder for purposes of the self-adaptation would continue exactly as will now be described. Further, if it is desirable that the input messages be transmitted and buffered in buffer storage, this feature could be added such that the read-out to the decoder was from such a buffer storage rather than directly from the input channel as herein described.

When the Synchronizing Commutator 288 has determined that a complete message has been received, it issues a pulse to the Timing Pulse Control 258 which issues the T5 control pulse on conductor 318 which causes the bias supply 282 to be switched to a constant current generator which will supply all of the correlation counters via conductor 284 with a current source which will cause the respective film elements to be biased in a manner to permit the respective Correlation Counters to count in a decreasing manner upon the receipt of subsequent count pulses on conductor 444. Having set the bias supply 282 to the count-down condition, the Timing Pulse Control 258 operates to repeatedly apply decrease count signals on conductor 790 to all of the Correlation Counter OR circuits, such as OR circuit 746, thereby causing all of the Correlation Counters to be decrementally altered by a count of 1 for each of such decrease count pulses. It will be recalled, from the separate consideration of the Correlation Counter (FIG. 19) that conductors 510, 512, 514, and 516 are coupled to the respective zero sides of T-FF0 through T-FF3. Therefore, when the Count Register 390 contains a zero, each of these conductors will have a "1" signal impressed thereon. These conductors are each applied as inputs to NOR circuit 792. It is the function of the message selecting NOR circuits, such as NOR circuit 792, to provide an indication that the associated Correlation Counter has passed to the zero condition. The first Correlation Counter to arrive at the zero condition obviously had the lowest numbered correlation value stored therein and is the message which should be selected. Returning again to the example, where an A was sent and was received correctly, the Correlation Counter 1 labeled 270 needs only to count down the weight value, whereas all other Correlation Counters must count down the combination of their respective weight values plus the detected permutation count. When the Correlation Counter 270 has counted to zero, NOR circuit 792 is provided with the plurality of "1" signal inputs and thereby provides an output on conductor 794 to the utilization device which indicates that message code A was received. The utilization device may take the form of a directly operable reproducing device which is activated by way of a single pulse for each message, or may take the form of an assembly device which further translates the pulses provided by the respective Correlation Counters upon receipt of their message signals to transform them into a further recognizable set of signals which represent the messages, or they may be assembled directly into an assembly memory for later utilization. Many other types of utilization devices may be used and it is not intended to hereby limit the scope of this invention. The output signal is also applied on conductor 796 to OR circuit 798 which is operative thereby to provide a disable signal on conductor 356. This disable is applied to the Timing Pulse Control 258 to cause the decrease-count signals which are applied on conductor 790 to be terminated. This means that having detected and decoded a message, it is not necessary to take further time in counting down the remainder of the Correlation Counters and this operation is terminated. The output from NOR circuit 792 is also applied to enable the history gates, shown enclosed in dashed block 334 via conductor 796. These gates consist of AND circuit 799 which is coupled to the one side of PFF-0, AND circuit 800 which is coupled to the one side of PFF-1, AND circuit 802 which is coupled to the one side of PFF-2, and AND circuit 804 which is coupled to the one side of PFF-3. The simultaneous enabling via conductor 796 of these AND circuits results in the respective permutations being passed through to the Permutation Counters shown enclosed in dash block 336. Exactly the same operation follows from the selection of any of the permissible messages and is further exemplified in that should the *n*th message be sent and received, an output would be provided from the code *n* correlation calculator and message selector 788 on conductor 806, which would be applied to the utilization device, and which would further be provided on conductor 808 to OR circuit 798 thereby causing the decrease-count pulse chain to be disabled. A further application of the selection signal would be via conductor 810 to the change history gates 812 which would cause the detected permutations to be transmitted from the permutation storage 784 via cable 814 through the gates 812 on cable 816 to the change history for the *n*th message 818.

Only the message type selected has the change history gates, such as gates 334, enabled. This follows since the detected differences between the nominal codes and the received signal groupings are not actually permutations for the non-selected messages, but are only differences which should normally result due to the different codes.

In the example described above where it was presumed that in the lowest ordered stage a difference was detected between the stored nominal code and the input signal received on conductor 574, there would have been a "1" signal set in PFF-0. Upon enabling of gate 799 by a pulse received on conductor 796, a "1" signal would be passed on conductor 820 to Permutation Counter 0 labeled 822. The Permutation Counters are identical and are of the type described above and shown in FIG. 22. The pulse on conductor 820 is in the form of an advance pulse and causes the Permutation Counter to be increased by a value of 1 for each detected permutation which is gated through. Upon reaching a predetermined value, such as the value 7 described in the example of FIG. 22, the occurrence of the next advanve pulse on conductor 820 causes the enabling pulse on conductor 824 which is applied to AND circuit 826 in combination with the "1" values received on cable 828 from Permutation Counter 0 to provide a pulse on conductor 830 which indicates that the predetermined number of permutations has been reached and the corresponding digit of the stored nominal code should be toggled to its opposite state. This output on conductor 830 is applied to the toggle input 702 of T-FF0 and causes it to store the opposite value from that previously stored therein. Therefore, if as the example pointed out T-FF0 had originally stored a "0" for the A code and 8 detected permutations had occurred such that an indication was present that the encoding system for the letter A had been changed, the pulse on conductor 830 causes the lowest ordered digit to now be a "1." In a similar manner, AND circuit 800 provides, when gated, a pulse on conductor 832 to Permutation Counter 1 labeled 834, and an enable signal to AND circuit 836 via conductor 838. When Permutation Counter 1 reaches its predetermined limit value, AND circuit 836 operates to produce a toggle pulse on conductor 840 which is coupled to conductor 704, thereby toggling T-FF1. The operation of AND circuit 802 is identical and when PFF-2 stored a "1," causes a pulse to be provided on conductor 842 to Permutation Counter 2 labeled 844. Upon reaching the maximum count, AND circuit 846 is fully enabled and produces a pulse on conductor 848 which is in turn coupled to conductor 706 and operates to toggle T-FF2. Finally, when PFF-3 stores a "1," and AND circuit 804 is enabled, an advance pulse is provided on conductor 850 which operates to advance Permutation Counter 3 labeled 852 and to enable AND circuit 854. When the count reaches the predetermined value, AND circuit 854 provides an output on conductor 856 which is coupled to conductor 708 and thereby causes T-FF3 to be toggled. It can be seen that the various stages can be toggled at any time upon the occurrence of the predetermined value in the respective Permutation Counters. As was described above, a Real-Time Control 368 is provided for causing the various Permutation Counters to be cleared upon the elapse of the preset time so that the various stages of the nominal codes may not be caused to be toggled due to an accumulation of noise pulses.

Having decoded the received message and having provided the enable to allow the change history to be updated, the Timing Pulse Control 258 operates to issue the T7 control pulse on conductor 362 thereby causing all of the Permutation Registers to be cleared to condition them so that the next message may be decoded.

Figure 25:
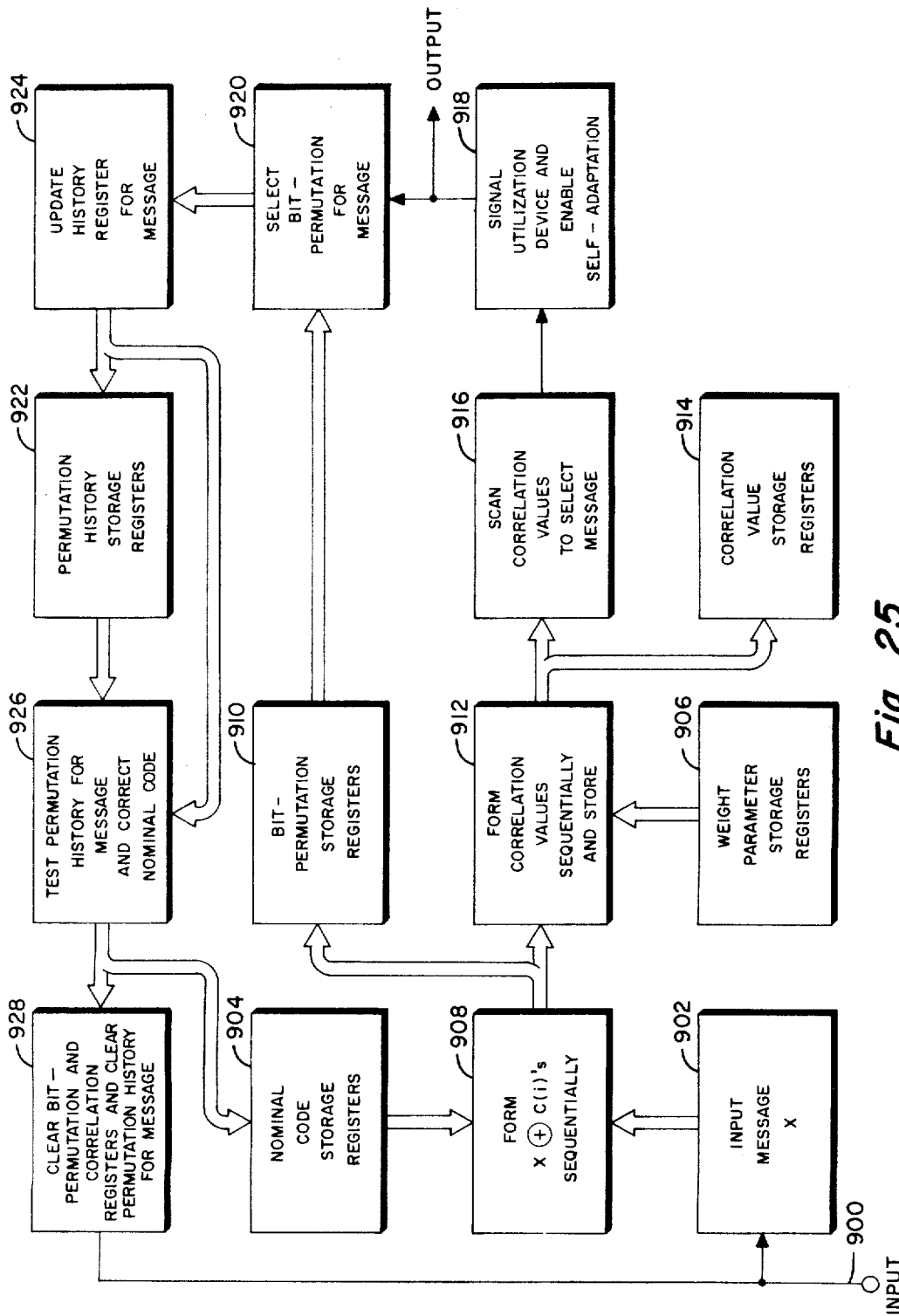
FIG. 25 is a logic diagram of a second embodiment of this invention wherein decoding is performed serially rather than in parallel.

The description to this point has been concerned with the parallel decoding of messages received. FIG. 25 is a block diagram illustration of a decoding device which operates under the same theory as that described above, but operates to consider each of the nominal message codes serially rather than in parallel as above described. The input signals are received on cable 900 and are formed into a parallel operand in Input Message X Register 902. This embodiment of the invention utilizes sections of mass storage of a type well known in the art, such as magnetic core registers which are individually addressable, for purposes of permanent and temporary storage of parameters. One of these memory sections stores the nominal codes which comprise the predetermined list of messages which can be handled by the system, and is illustrated as block 904. A further group of storage registers is utilized to store the initially calculated weight parameters, and is illustrated as block 906. Upon receiving a complete input message, the operation is started which forms the logical product (Exclusive-OR) of the X message with the respective nominal codes in sequence, as illustrated by block 908. This operation is performed upon the digits of the message either serially or in parallel, as was described above. Upon the completion of the logical sum of each nominal code and the received message, two operations are performed in parallel. The first of these operations is to store the detected digit permutations in the addressable storage registers which are provided for retaining this data labeled 910. The second of these operations is to form the correlation values sequentially 912 and store the respective values in the correlation value storage registers 914. Upon completion of the sequential forming of the respective logical sum operations, it is necessary to scan the correlation values 916 to detect the lowest valued record stored in the correlation value storage registers 914. Upon determining the address of the correlation which indicates the message type, a signal is issued to the utilization device 918 and the self-adaptation is initiated. Having selected the correlation value which indicates which message type has been received, information is available which provides access to the bit-permutation storage registers 910 as disclosed in block 920. The value of stored one's in the bit-permutation register which corresponds to the message type selected is utilized to up-date the history storage registers 922 for the message type which was selected, as denoted by block 924. Having up-dated the permutation history storage register, it is necessary to test the up-dated value to determine whether any of the digits of the corresponding nominal code should be corrected. This operation consists of examining the record for each of the digit positions such that the predetermined value which when attained requires alteration will cause the alteration to be made in the appropriate digit in the nominal code storage register. This operation is illustrated by block 926. Should it occur that no correction is necessary due to the examination of the permutation history, no further operation is necessary and the apparatus proceeds to clear all of the bit-permutation storage registers 910, clear the correlation value storage registers 914, and continue to the evaluation of the next input message. Additionally, in those cases where the permutation history indicates that a message should be updated, it is necessary to clear the permutation history storage register 922 which corresponds to the digit position which has been corrected. This operation is illustrated in block 928.

The advantage of this second embodiment, lies in the fact that it is more economical of hardware in that the parallel consideration of the nominal codes with the attendant parallel circuitry is not necessary. The operation can proceed with one set of the circuits as described with the additional cycling control which controls the number of times the operation occurs as determined by the number of messages. Another aspect is in those cases where the communication channel is extremely slow, the attendant speed of the parallel consideration is not required and the serial operation may be more than adequate. Further, this serial operation may be desirable in those instances where the communication of messages is provided with buffer storage at the input such that decoding may be carried on independently from the data transmission.

The invention described above comprises apparatus for automatically responding to input message signals and decoding the same to provide a signal which indicates which of a class of messages has been received, and provides a means for self-adaptation to changes in the encoding system without requiring the transmission of keying information. The system is operative to decode correctly messages which have been subjected to perturbation due to the injection of noise. For purposes of these descriptions, the apparatus described above comprises equipment which generate or respond to electrical impulses; however, the principles of this invention are applicable to equipment of all types and need not necessarily be either electrical or impulse responsive. The particular examples presented here and above are intended as illustrative only and are not intended to be construed as limiting in any sense. From the foregoing, it can be seen that the above enumerated objects and purposes of the invention have been fully achieved.

It is understood that suitable modifications may be made in the structure as disclosed provided such modifications come within the spirit and scope of the appended claims. Having now, therefore, fully illustrated and described our invention, what is claimed to be new and desired to be protected by Letters Patent is defined in the following claims.

What is claimed is:

1. An adaptive signal responsive system comprising:
  a source of message signals;
  a source of encoding signals;
  means for randomly altering selected ones of said encoding signals;
  encoding means responsively coupled to said message signals and to said encoding signals for forming, according to a predetermined plan, encoded message signals;
  transmission means coupled to said encoding means, and normally operative to transmit said encoded message signals;
  receiving means responsively coupled to said transmission means for receiving said encoded message signals;
  a source of decoding signals;
  correlation-determining means coupled to said receiving means and said source of decoding signals, and operative on receipt of encoded message signals to provide correlation-indicating signals representative of the degree of correlation between said encoded message signals and said decoding signals;
  decoding means coupled to said correlation-determining means for evaluating said correlation-indicating signals to provide signals indicative of the messages received; and
  adaptive means responsively coupled to said decoding means and to said correlation-determining means for adapting selected ones of said decoding signals to correspond to alterations made in said encoding signals when actuated by said message indicating signals.

2. An adaptive signal responsive system comprising:
  a source of message signals to be encoded for transmission;
  a plurality of encoding-signal storage means, each for storing a predetermined distinct grouping of digital encoding signals;
  means for randomly selecting ones of said encoding-signal storage means for alteration;
  alteration means responsively coupled to said randomly selecting means for altering, according to a predetermined plan, selected ones of said digital encoding signals;
  encoding means responsively coupled to said source of message signals and said encoding-signal storage means for forming, according to a predetermined plan, encoded message signals;
  transmission means coupled to said encoding means for transmitting said encoded message signals;
  a plurality of decoding-signal storage means, each for initially storing a predetermined distinct grouping of digital decoding signals, where each of said groups of decoding signals corresponds in a predetermined manner to an associated one of said stored encoding-signal groupings;
  signal receiving means coupled to said transmission means for receiving said encoded message signals;
  a plurality of weight-factor storage means, each for storing predetermined weight-indicating signals which represent weights to be accorded to associated message types during decoding of said encoded message signals;
  message-correlation determining means coupled to said signal receiving means, said decoding-signal storage means, and said weight-factor storage means, and operative on receipt of encoded message signals to provide message correlation indicating signals, said message-correlation indicating signals being representative of the degree of correlation between said received encoded message signals and said decoding signals;
  decoding means coupled to said message-correlation determining means for determining the messages received in response to said message-correlation indicating signals, and providing messsage identification signals;
  enabling means coupled to said decoding means for enabling adaptation of digital decoding signals which correspond to indicated received message signals; and
  adaptive means responsively coupled to said enabling means for adapting selected ones of said digital decoding signals to correspond to alterations made in said digital encoding signals.

3. An adaptive signal responsive system as in claim 2 wherein said adaptive means comprises:
  difference means for providing signal indications of differences between said received encoded message signals and digital decoding signals;
  accumulating means coupled to said difference means and said enabling means for accumulating said difference signals when actuated by said enabling signal; and
  decoding signal adapting means coupled to said accumulating means for adapting selected ones of said digital decoding signals to correspond to alterations made in said digital encoding signals when said accumulated signals attain a predetermined accumulated value.

4. An adaptive signal responsive system as in claim 3 and further including real-time control of decoding-signal adaptation comprising:
  elapsed-time determining control means for periodically setting said accumulating means to an initial condition.

5. An adaptive signal responsive system as in claim 4 wherein said elapsed-time determining control means comprises:
  a continuous source of counting pulses;
  real-time indicating means coupled to said continuous source of counting pulses to accumulate said counting pulses for continuously providing signals indicative of elapsed real-time;
  selectively alterable control-signal storage means for providing control signals indicative of a predetermined increment of time;
  comparison means coupled to said real-time indicating means and said control-signal storage means for providing a signal to set said accumulating means to an initial condition when said elapsed real-time indicating signals correspond in a predetermined manner to said control signals; and means coupled to said comparison means for setting said real-time indicating means to an initial condition in response to said clear signal.

6. An adaptive signal responsive system for handling messages of predetermined types comprising:
a source of message signals to be encoded for transmission;
a plurality of encoding-signal storage means, each for storing a predetermined distinct grouping of digital encoding signals;
means for randomly selecting ones of said encoding-signal storage means for alteration;
alteration means responsively coupled to said randomly selecting means for altering, according to a predetermined plan, selected ones of said digital encoding signals;
encoding means reponsively coupled to said source of message signals and said encoding-signal storage means for forming, according to a predetermined plan, encoded message signals;
transmission means coupled to said encoding means for transmitting said encoded message signals;
a plurality of decoding-signal storage means, each for initially storing a predetermined distinct grouping of digital decoding signals which correspond in a predetermined manner to associated ones of said stored encoding-signal groupings;
signal receiving means coupled to said transmission means for receiving said encoded message signals;
a plurality of weight-factor storage means, each for storing predetermined weight indicating signals which represent weights to be accorded to associated message types during decoding of said encoded message signals;
message-correlation determining means coupled to said signal receiving means, said plurality of decoding-signal storage means in parallel, and said plurality of weight-factor storage means in parallel, and operative on receipt of encoded message signals to provide message-correlation indicating signals, said message-correlation indicating signals being formed in parallel for the respective decoding signal groupings and representative of the degree of correlation between said received encoded message signals and said decoding signals;
decoding means coupled to said message-correlation determining means for determining the messages received in response to said message correlation indicating signals, and providing message identification signals;
enabling means coupled to said decoding means and actuated by said message identification signals for enabling adaptation of digital decoding signals which correspond to indicated received message signals; and
adaptive means responsively coupled to said enabling means for adapting selected ones of said digital decoding signals to correspond to alteration made in said digital encoding signals.

7. An adaptive signal responsive system for handling $n$ predetermined message types comprising:
a source of message signals to be encoded for transmission, said messages being within the class of $n$ messages;
at least $n$ encoding-signal storage means, each for storing a predetermined grouping of $j$ distinct digital encoding signals;
means for randomly selecting ones of said encoding-signal storage means for alteration;
alteration means responsively coupled to said randomly selecting means for altering, according to a predetermined plan, selected ones of said digital encoding signals;
encoding means responsively coupled to said source of message signals and said $n$ encoding-signal storage means for forming, according to a predetermined plan, encoded digital message signals;
serial transmission means coupled to said encoding means for transmitting said encoded digital message signals sequentially in groups of $j$ digits;
at least $n$ decoding-signal storage means, each for initially storing a predetermined distinct grouping of $j$ digital decoding signals, where each of said groups of decoding signals corresponds to an associated one of said stored encoding-signal groupings;
signal receiving means coupled to said serial transmission means for receiving said encoded message signals;
at least $n$ weight-factor storage means, each for storing predetermined weight indicating signals which represent weights to be accorded to associated message types during decoding of said encoded message signals;
message-correlation determining means coupled to said signal receiving means, said plurality of decoding-signal storage means in parallel, and said plurality of weight-factor storage means in parallel, and operative on receipt of encoded messsage signals to provide message-correlation indicating signals, said message-correlation indicating signals being formed in parallel for the respective decoding signal groupings and representative of the degree of correlation between said received encoded message signals and said decoding signals;
commutating means coupled to said signal receiving means for sequentially gating each of said received encoded message signals into said message-correlation determining means for evaluation as received;
decoding means coupled to said message-correlation determining means for determining the messages received in response to said message-correlation indicating signals, and providing message identification signals;
enabling means coupled to said decoding means and actuated by said message identification signals for enabling adaptation of digital decoding signals which correspond to indicated received message signals; and
adaptive means responsively coupled to said enabling means for adapting selected ones of said digital decoding signals to correspond to alterations made in said digital encoding signals.

8. A signal responsive system comprising:
a source of message signals to be encoded for transmission;
a plurality of encoding-signal storage means, each for storing a predetermined distinct grouping of digital encoding signals;
encoding means responsively coupled to said source of message signals and said encoding-signal storage means for forming, according to a predetermined plan, encoded message signals;
transmission means coupled to said encoding means for transmitting said encoded message signals;
a plurality of decoding-signal storage means, each for initially storing a predetermined distinct grouping of digital decoding signals, where each of said groups of decoding signals corresponds in a predetermined manner to an associated one of said stored encoding-signal groupings;
signal receiving means coupled to said transmission means for receiving said encoded message signals;
a plurality of weight-factor storage means, each for storing predetermined weight-indicating signals which represent weights to be accorded to associated message types during decoding of said encoded message signals;
message-correlation determining means coupled to said signal receiving means, said decoding-signal storage means, and said weight-factor storage means, and operative on receipt of encoded message signals to provide message-correlation indicating signals representative of the degree of correlation between said received encoded message signals and said decoding signals; and decoding means coupled to said message-correlation determining means for determining the messages received in response to said message-correlation indicating signals for providing message identification signals.

9. An adaptive signal responsive system capable of handling a set of predetermined allowable message types, with selectively alterable encoding signals, encoding circuitry for providing encoded message signals for desired ones of the set of messages, and transmitting apparatus for transmitting encoded message signals, decoding apparatus comprising:

a plurality of decoding-signal storage means, each for initially storing a predetermined distinct grouping of digital decoding signals, where each of said groups of decoding signals corresponds to an associated one of said stored encoding-signal groupings;

signal receiving means for receiving said encoded message signals;

a plurality of weight-factor storage means, each for storing predetermined weight-indicating signals which represent weights to be accorded to associated message types during decoding of the encoded message signals;

message-correlation determining means coupled to said signal receiving means, said decoding-signal storage means, and said weight-factor storage means, and operative on receipt of encoded message signals to provide message-correlation indicating signals, representative of the degree of correlation between said received encoded message signals and said decoding signals;

commutating means coupled to said signal receiving means for sequentially gating each of said received encoded message signals into said message-correlation determining means for evaluation as received;

decoding means coupled to said message-correlation determining means for determining the messages received in response to said message-correlation indicating signals, and providing message identification signals;

enabling means coupled to said decoding means and actuated by said message identification signals for enabling adaptation of digital decoding signals which correspond to indicated received message signals; and adaptive means responsively coupled to said enabling means for adapting selected ones of said digital decoding signals to correspond to alterations made in said digital encoding signals.

10. An adaptive signal responsive system capable of handling a predetermined set of $n$ message types comprised of $j$ digit positions, $n$ encoding-signal groupings of $j$ digit positions, apparatus for randomly selecting and altering ones of the encoding signals, encoding apparatus for providing encoded digital message signals of $j$ digit positions for desired ones of the permissible messages, and means for transmitting the encoded message signals, decoding apparatus comprising:

at least $n$ nominal code storage registers, each of said registers having $j$ stages and preset to store discrete digital signal groups which initially correspond in a predetermined manner to an associated group of encoding signals;

receiving means for receiving encoded digital message signals;

at least $n$ message-signal comparing circuits, each having at least $j$ digit-comparison circuits, each of said digit-comparison circuits coupled to a particular stage of a distinct one of said nominal code storage registers and coupled to said receiving means for comparing each digital signal of said encoded message to correspondingly ordered digit signals of the associated nominal code to provide for each digit position in parallel first valued signal representations when exact comparison is found and second valued signal representations when said message signals and said nominal code signals differ;

a commutating circuit coupled to said receiving means for sequentially applying each signal of said received encoded digital message signals to correspondingly ordered ones of said digit-comparison circuits;

at least $n$ permutation storage registers, each coupled to a distinct one of said message-signal comparing circuits in a manner such that each stage of said permutation storage registers is coupled to a distinct one of said digit-comparison circuits, each of said stages responsive to store first valued permutation signals in response to applied ones of said first valued signals, and to store second valued permutation signals in response to applied ones of said second valued signals;

at least $n$ weight-storage registers, each associated with a distinct one of message-signal comparing circuits, and preset to store weight-indicating signals representative of the relative probability of receiving the message types;

at least $n$ correlation-determining means preconditioned to store associated ones of said weight-indicating signals, each coupled to an associated one of said message-signal comparing circuits and responsive to accumulate the number of detected differences between digits of said encoded message and digits of said nominal codes to form correlation signals indicative of the degree of correlation of said message signals to said nominal codes;

at least $n$ message-selecting means coupled to associated ones of said correlation-determining means for selecting the message indicated by the lowest valued one of said correlation signals, and providing message-identifying signals;

at least $n$ groups of $j$ permutation history accumulating circuits, each coupled to a distinct stage of said permutation storage register for providing a count of said first valued pulses;

at least $n$ enabling means coupled to said message-selecting means and said permutation registers for actuating the accumulation of detected permutations and signals indicating the value of said accumulation in response to said message-identifying signals; and at least $n$ groups of adaptation circuits having $j$ stages coupled to respective ones of said permutation history accumulating circuits and distinct stages of said nominal code storage registers for altering selected ones of said nominal code signals in response to predetermined values of said accumulated permutation indicating signals.

11. An adaptive signal responsive system as in claim 10 and further including elapsed-time determining control means comprising:

a contiuous source of counting pulses;

real-time indicating means coupled to said continuous source of counting pulses to accumulate said counting pulses for continuously providing signals indicative of elapsed real-time;

selectively alterable control-signal storage means for providing control signals indicative of a predetermined increment of time;

comparison means coupled to said real-time indicating means and said control signal storage means for providing a signal to clear said $n$ groups of $j$ permutation history accumulating circuits when said elapsed real-time indicating signals correspond to said control signals; and means coupled to said comparison means for setting said real-time indicating means to an initial condition in response to said clear signal.

12. A signal responsive system capable of handling a set of predetermined allowable messages, with encoding circuitry for providing encoded message signals for desired ones of the set of messages, and transmitting apparatus for transmitting encoded messages, decoding apparatus comprising:
- a plurality of decoding-signal storage means, each for storing a predetermined distinct grouping of digital decoding signals;
- signal receiving means for receiving encoded message signals;
- a plurality of weight-factor storage means, each for storing predetermined weight indicating signals which represent weights to be accorded to associated message types during decoding of message signals;
- message-correlation determining means coupled to said signal receiving means, said decoding-signal storage means, and said weight-factor storage means, and operative on receipt of encoded message signals to provide message-correlation indicating signals representative of the degree of correlation between said received encoded message signals and said decoding signals; and
- decoding means coupled to said message-correlation determining means for determining the messages received in response to said message-correlation indicating signals, and for providing message identification signals.

13. A signal responsive secrecy system comprising:
- a source of message signals to be encoded for transmission;
- a source of encoding-signals;
- encoding means responsively coupled to said source of message signals and said source of encoding-signals for forming, according to a predetermined plan, encoded message signals;
- secrecy transmission means coupled to said encoding means for alternately transmitting said encoded message signals and randomly generated noise signals, the number of noise signals having a predetermined relationship to the number of message signals;
- a plurality of decoding-signal storage means, each for initially storing a predetermined distinct grouping of digital decoding signals, where each of said groups of decoding signals corresponds in a predetermined manner to an associated one of said encoding-signals;
- signal receiving means coupled to said transmission means for receiving said encoded message signals;
- message-correlation determining means coupled to said signal receiving means and said decoding-signal storage means, and operative on receipt of encoded message signals to provide message-correlation indicating signals representative of the degree of correlation between said received encoded message signals and said decoding signals;
- secrecy commutating means coupled to said signal receiving means for alternately gating said received encoded messages into said message-correlation determining means for evaluation as received, and disabling the application of said randomly generated noise signals to said message-correlation determining means; and
- decoding means coupled to said message-correlation determining means for determining the messages received in response to said message-correlation indicating signals for providing message identification signals.

14. A signal responsive secrecy system comprising:
- a source of message signals to be encoded for transmission;
- a plurality of encoding-signal storage means, each for storing a predetermined distinct grouping of digital encoding signals;
- encoding means responsively coupled to said source of message signals and said encoding-signal storage means for forming, according to a predetermined plan, encoded message signals;
- secrecy transmission means coupled to said encoding means for alternately transmitting said encoded message signals and randomly generated noise signals, the number of noise signals having a predetermined relationship to the number of message signals;
- a plurality of decoding-signal storage means, each for initially storing a predetermined distinct grouping of digital decoding signals, where each of said groups of decoding signals corresponds in a predetermined manner to an associated one of said stored encoding-signal groupings;
- signal receiving means coupled to said transmission means for receiving said encoded message signals;
- a plurality of weight-factor storage means, each for storing predetermined weight indicating signals which represent weights to be accorded to associated message types during decoding of said encoded message signals;
- message-correlation determining means coupled to said signal receiving means, said decoding-signal storage means, and said weight-factor storage means, and operative on receipt of encoded message signals to provide message-correlation indicating signals representative of the degree of correlation between said received encoded message signals and said decoding signals;
- secrecy commutating means coupled to said signal receiving means for alternately gating said received encoded messages into said message-correlation determining means for evaluation as received, and disabling the application of said randomly generated noise signals to said message-correlation determining means; and
- decoding means coupled to said message-correlation determining means for determining the messages received in response to said message-correlation indicating signals for providing message identification signals.

15. An adaptive signal responsive secrecy system comprising:
- a source of message signals to be encoded for transmission;
- a source of encoding-signals;
- encoding means responsively coupled to said source of message signals and said source of encoding-signals for forming, according to a predetermined plan, encoded message signals;
- means for randomly selecting and altering according to a predetermined plan ones of said encoding signals;
- secrecy transmission means coupled to said encoding means for alternately transmitting said encoded message signals and randomly generated noise signals, the number of noise signals having a predetermined relationship of the number of message signals;
- a plurality of decoding-signal storage means, each for initially storing a predetermined distinct grouping of digital decoding signals, where each of said groups of decoding signals corresponds in a predetermined manner to an associated one of said encoding-signals;
- signal receiving means coupled to said transmission means for receiving said encoded message signals;
- message-correlation determining means coupled to said signal receiving means and said decoding-signal storage means, and operative on receipt of encoded message signals to provide message-correlation indicating signals representative of the degree of correlation between said received encoded message signals and said decoding signals;
- secrecy commutating means coupled to said signal receiving means for alternately gating said received encoded messages into said message-correlation determining means for evaluation as received, and disabling the application of said randomly generated noise signals to said message-correlation determining means;

decoding means coupled to said message-correlation determining means for determining the messages received in response to said message-correlation indicating signals for providing message identification signals;

enabling means coupled to said decoding means and actuated by said message identification signals for enabling adaptation of digital decoding signals which correspond to indicated received message signals; and adaptive means responsively coupled to said enabling means for adapting selected ones of said digital decoding signals to correspond to alterations made in said digital encoding signals.

16. An adaptive signal responsive secrecy system as in claim 15 wherein said adaptive means comprises:

difference means for providing signal indications of differences between said received encoded message signals and digital decoding signals;

accumulating means coupled to said difference means and said enabling means for accumulating said difference signals when actuated by said enabling signal; and decoding signal adapting means coupled to said accumulating means for adapting selected ones of said digital decoding signals to correspond to alterations made in said digital encoding signals when said accumulated signals attain a predetermined accumulated value.

17. A adaptive signal responsive secrecy system as in claim 16 and further including real-time control of decoding signal adaptation comprising:

elapsed-time determining control means for periodically setting said accumulating means to an initial condition.

18. An adaptive signal responsive secrecy system as in claim 17 wherein said elapsed time determining control means comprises:

a continuous source of counting pulses;

real-time indicating means coupled to said continuous source of counting pulses to accumulate said counting pulses for continuously providing signals indicative of elapsed real-time;

selectively alterable control signal storage means for providing control signals indicative of a predetermined increment of time;

comparison means coupled to said real-time indicating means and said control signal storage means for providing a signal to clear said accumulating means when said elapsed real-time indicating signals correspond to said control signals; and means coupled to said comparison means for setting said real-time indicating means to an initial condition in response to said clear signal.

19. An adaptive signal responsive secrecy system capable of handling a predetermined set of $n$ message types comprised of $j$ digit positions, $n$ encoding-signal groupings of $j$ digit positions, apparatus for randomly selecting and altering ones of the encoding signals, encoding apparatus for providing encoded digital message signals of $j$ digit positions for desired ones of the permissible messages, and means for alternately transmitting the encoded message signals and bursts of noise signals, decoding apparatus comprising:

at least $n$ nominal code storage register, each of said registers having $j$ stages and preset to store discrete digital signal groups which initially correspond in a predetremined manner to an associated group of encoding signals;

receiving means for receiving encoded digital message signals;

at least $n$ message-signal comparing circuits, each having at least $j$ digit-comparison circuits, each of said digit-comparison circuits coupled to a particular stage of a distinct one of said nominal code storage registers and coupled to said receiving means for comparing each digital signal of said encoded message to correspondingly ordered digit signals of the associated nominal code to provide for each digit position in parallel first valued signal representations when exact comparison is found and second valued signal representations when said message signals and said nominal code signals differ;

a commutating circuit coupled to said receiving means for alternately sequentially gating each signal of said received encoded digital message signals to correspondingly ordered ones of said digit-comparison circuits and disabling the application of randomly generated noise signals to said digit-comparison circuits;

at least $n$ permutation storage registers, each coupled to a distinct one of said message-signal comparing circuits in a manner such that each stage of said permutation storage registers is coupled to a distinct one of said digit-comparison circuits, each of said stages responsive to store first valued permutation signals in response to applied ones of said first valued signals, and to store second valued permutation signals in response to applied ones of said second valued signals;

at least $n$ weight-storage registers, each associated with a distinct one of message-signal comparing circuits, and preset to store weight-indicating signals representative of the relative probability of receiving the message types;

at least $n$ correlation-determining means preconditioned to store associated ones of said weight-indicating signals, each coupled to an associated one of said message-signal comparing circuits and responsive to accumulate the number of detected differences between digits of said encoded message and digits of said nominal codes to form correlation signals indicative of the degree of correlation of said message signals to said nominal codes;

at least $n$ message-selecting means coupled to associated one of said correlation-determining means for selecting the message indicated by the lowest valued one of said correlation signals, and providing message-identifying signals;

at least $n$ groups of $j$ permutation history accumulating circuits, each coupled to a distinct stage of said permutation storage register for providing a count of said first valued pulses;

at least $n$ enabling means coupled to said message-selecting means and said permutation registers for actuating the accumulation of detected permutations and signals indicating the value of said accumulation in response to said message-identifying signals; and at least $n$ groups of adaptation circuits having $j$ stages coupled to respective ones of said permutation history accumulating circuits and distinct stages of said nominal code storage registers for altering selected ones of said nominal code signals in response to predetermined values of said accumulated permutation indicating signals.

20. An adaptive signal responsive system capable of handling a set of predetermined allowable message types, with encoding circuitry for providing encoded message signals for desired ones of the set of messages in response to selectively alterable encoding control signals, and transmitting apparatus for transmitting encoded messages, decoding apparatus comprising:

receiving means responsively coupled to said transmission means for receiving said encoded message signals;

a source of decoding signals;

correlation-determining means coupled to said receiving means and said source of decoding signals, and operative on receipt of encoded message signals to provide correlation-indicating signals representative of the degree of correlation between said encoded message signals, and said decoding signals;

decoding means coupled to said correlation-determining means for evaluating said correlation-indicating signals to provide signals indicative of the messages received; and adaptive means responsively coupled to said decoding means and to said correlation-determining means for adapting selected ones of said decoding signals to correspond to alterations made in said encoding signals when actuated by said message indicating signals, said adaptive means including difference means for providing signal indications of differences between said received encoded message signals and digital decoding signals; accumulating means coupled to said difference means and said enabling means for accumulating said difference signals when actuated by said enabling signal; and decoding signal adapting means coupled to said accumulating means for adapting selected ones of said digital decoding signals to correspond to alterations made in said digital encoding signals when said accumulated signals attain a predetermined accumulated value.

21. For use in a continuously self-adaptive message decoding apparatus having at least one nominal decoding word, storing means for storing signals indicative of at least one decoding word;

receiving means for receiving signals indicative of a coded message word;

logical summing means coupled to said storing means and said receiving means for forming signals indicative of the bit-by-bit logical sum of said decoding word and said message word;

correlation means coupled to said logical summing means for providing signals indicative of the degree of correlation between said decoding word and said message word;

detecting means coupled to said logical summing means, and controlled at least in part thereby, for detecting the necessity of altering said decoding word; and adapting means coupled to said detecting means for causing selective alteration of said decoding word, thereby adapting said decoding word for further decoding processes.

References Cited

UNITED STATES PATENTS

| | | | |
|---|---|---|---|
| 3,195,107 | 7/1965 | Rudolph | 340—146.1 |
| 3,209,328 | 9/1965 | Bonner | 340—172.5 |

ROBERT C. BAILEY, *Primary Examiner.*

PAUL J. HENON, *Examiner.*

M. LISS, *Assistant Examiner.*

UNITED STATES PATENT OFFICE
CERTIFICATE OF CORRECTION

Patent No. 3,360,778

December 26, 1967

Edward Jack Farrell

It is hereby certified that error appears in the above numbered patent requiring correction and that the said Letters Patent should read as corrected below.

Column 35, line 5, strike out "de-"; column 36, line 59, for "contiuous" read -- continuous --; column 38, line 56, for "of", first occurrence, read -- to --; column 39, line 18, for "16," read -- 16. --; line 33, for "A" read -- An --; line 71, for "predetremined" read -- predetermined --; column 40, line 41, for "one" read -- ones --.

Signed and sealed this 18th day of February 1969.

(SEAL)
Attest:

Edward M. Fletcher, Jr.
Attesting Officer

EDWARD J. BRENNER
Commissioner of Patents